United States Patent [19]

Nakashima et al.

[11] Patent Number: 4,775,939

[45] Date of Patent: Oct. 4, 1988

[54] ATTITUDE CONTROLLING SYSTEM FOR VEHICLE-SUPPORTED EQUIPMENT

[75] Inventors: Hiroshi Nakashima, Toyota; Masanobu Ishikawa, Nagoya; Kohji Hiro, Chiryu; Kazutaka Kuwana, Toyota, all of Japan

[73] Assignees: Aisin Seiki Kabushikikaisha; Toyota Jidosha Kabushiki Kaisha

[21] Appl. No.: 774,511

[22] Filed: Sep. 10, 1985

[30] Foreign Application Priority Data

Sep. 10, 1984 [JP] Japan ................................ 59-189456
Sep. 10, 1984 [JP] Japan ................................ 59-189458
Sep. 12, 1984 [JP] Japan ................................ 59-191349

[51] Int. Cl.$^4$ ............................................ G06F 15/20
[52] U.S. Cl. ................................ 364/424.05; 364/425; 318/467
[58] Field of Search ................ 364/424, 425; 318/568, 318/467, 466; 74/484 R

[56] References Cited

U.S. PATENT DOCUMENTS

| | | | |
|---|---|---|---|
| 4,204,255 | 5/1980 | Cremer | 364/425 |
| 4,217,792 | 8/1980 | Kesling | 74/484 R |
| 4,264,849 | 4/1981 | Fleischer et al. | 318/568 |
| 4,267,494 | 5/1981 | Matsuoka et al. | 318/568 |
| 4,401,928 | 8/1983 | Kamijo et al. | 318/466 |
| 4,404,632 | 9/1983 | Harada et al. | 364/425 |
| 4,434,468 | 2/1984 | Caddick et al. | 318/466 |
| 4,451,887 | 5/1984 | Harada et al. | 364/424 |
| 4,456,861 | 6/1984 | Ratzel et al. | 318/568 |
| 4,463,426 | 7/1984 | Caddick et al. | 364/424 |
| 4,503,504 | 3/1985 | Suzumura et al. | 364/425 |
| 4,527,444 | 7/1985 | McKee | 74/484 R |
| 4,537,089 | 8/1985 | Moneta | 74/484 R |
| 4,547,718 | 10/1985 | Ratzel et al. | 318/568 |
| 4,608,637 | 8/1986 | Okuyama et al. | 364/424 |

Primary Examiner—P. S. Lall
Assistant Examiner—V. N. Trans
Attorney, Agent, or Firm—Sughrue, Mion, Zinn, Macpeak, and Seas

[57] ABSTRACT

A tilt steering mechanism, a telescopic steering mechanism and a seat attitude adjusting mechanism are controlled in their attitudes by an electric motor such that the respective attitudes are automatically set into a retreat attitude where the driver easily gets on and off a vehicle upon boarding/alighting, and into a driving attitude assumed before retreat upon the completion of boarding. Whether or not the driver is about to get on and off the vehicle is judged in accordance with the status of an ignition switch, status of a door switch, vehicle speed, status of a parking brake, shift lever position of a transmission, etc. A change speed of attitude is monitored during energization of the electric motor and, if the change speed is less than a predetermined value, this is judged as the presence of overload and the electric motor is stopped.

9 Claims, 25 Drawing Sheets

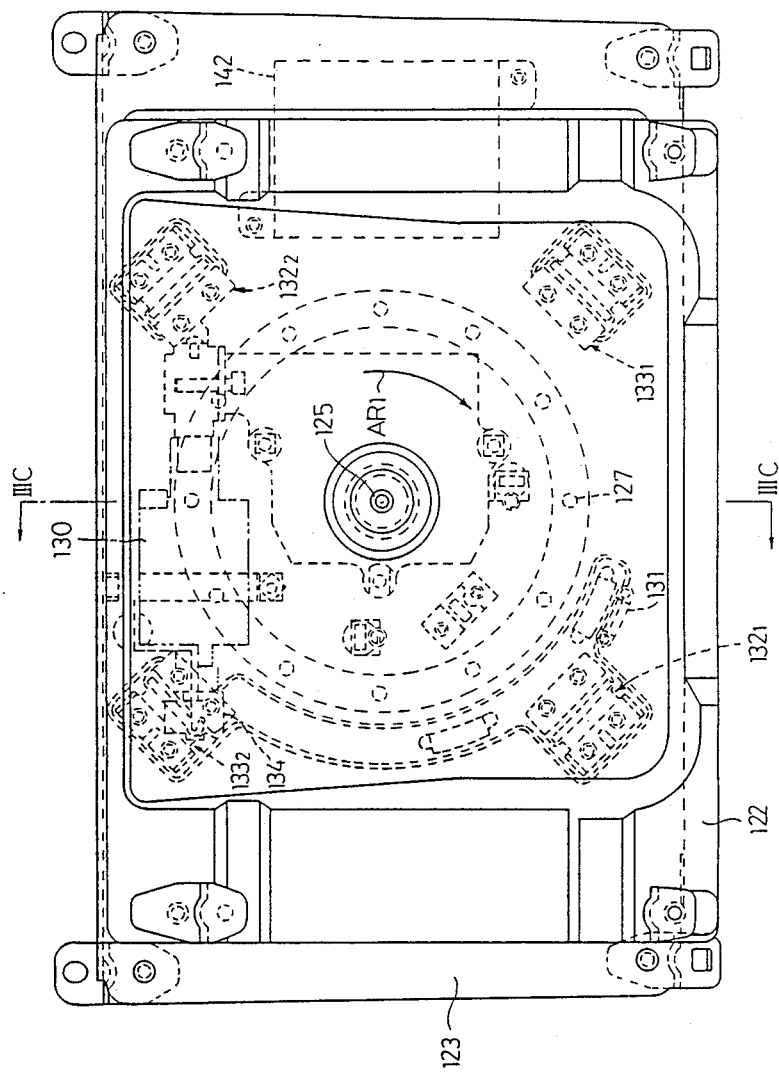

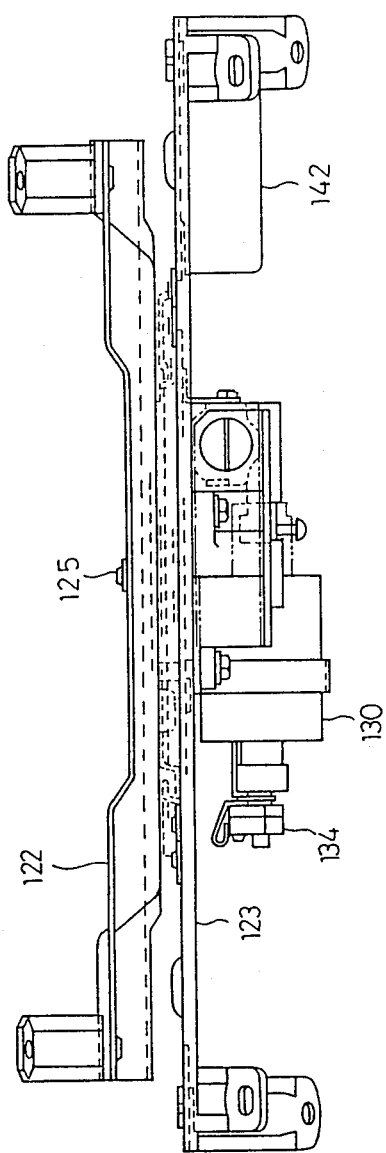
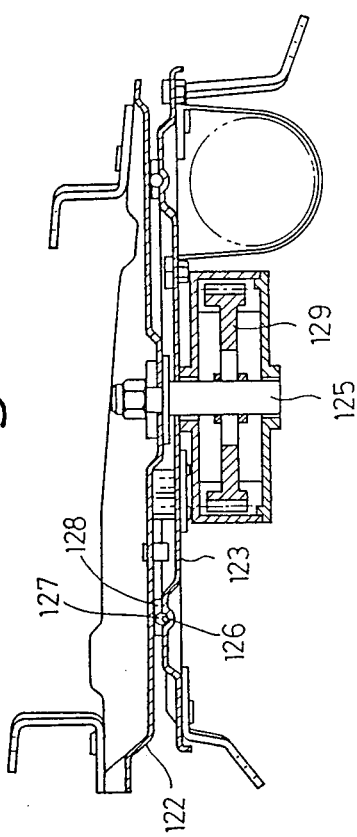

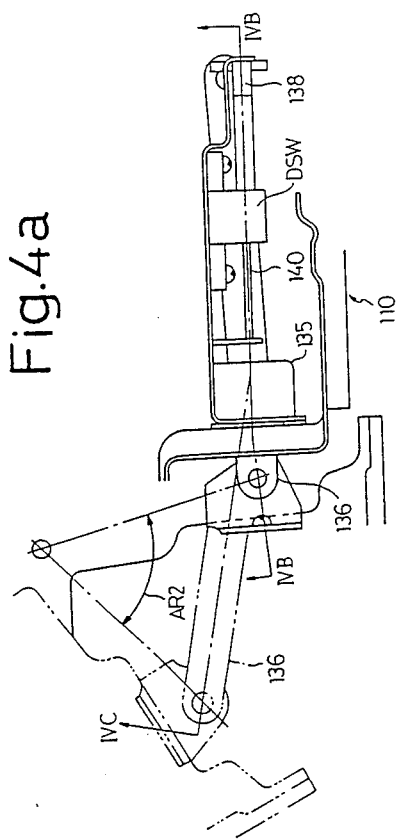
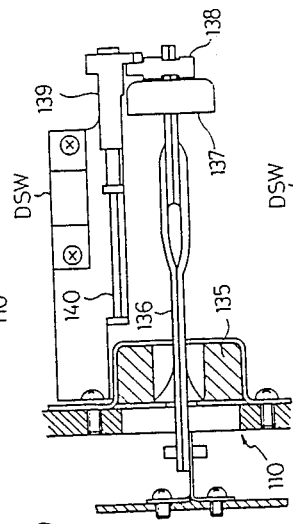
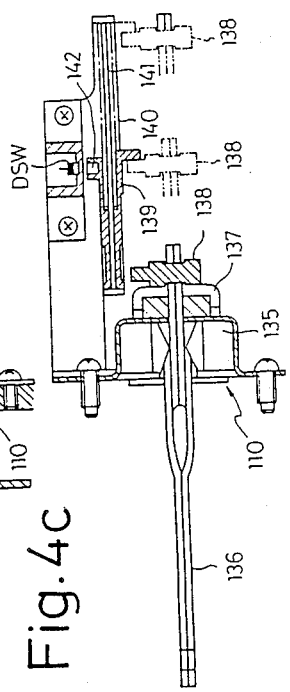
Fig.4a
Fig.4b
Fig.4c

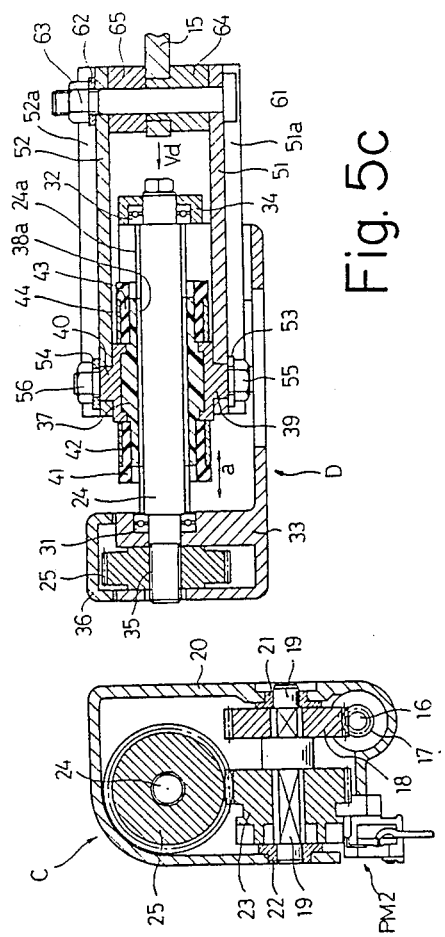
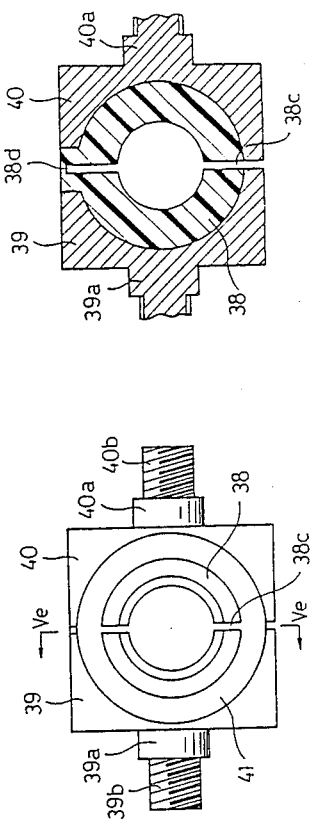
Fig. 5b  Fig. 5c  Fig. 5d  Fig. 5f

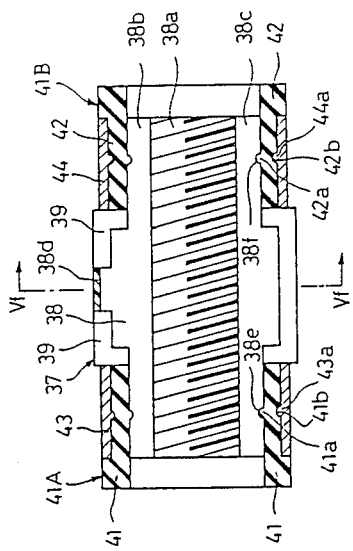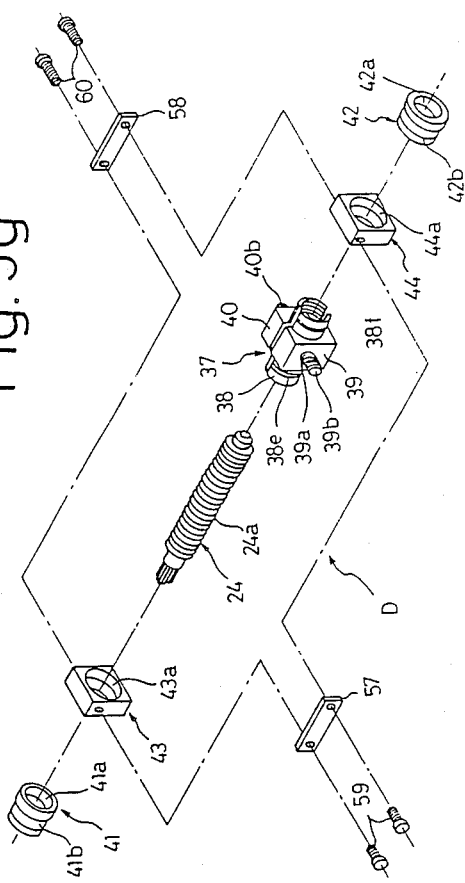

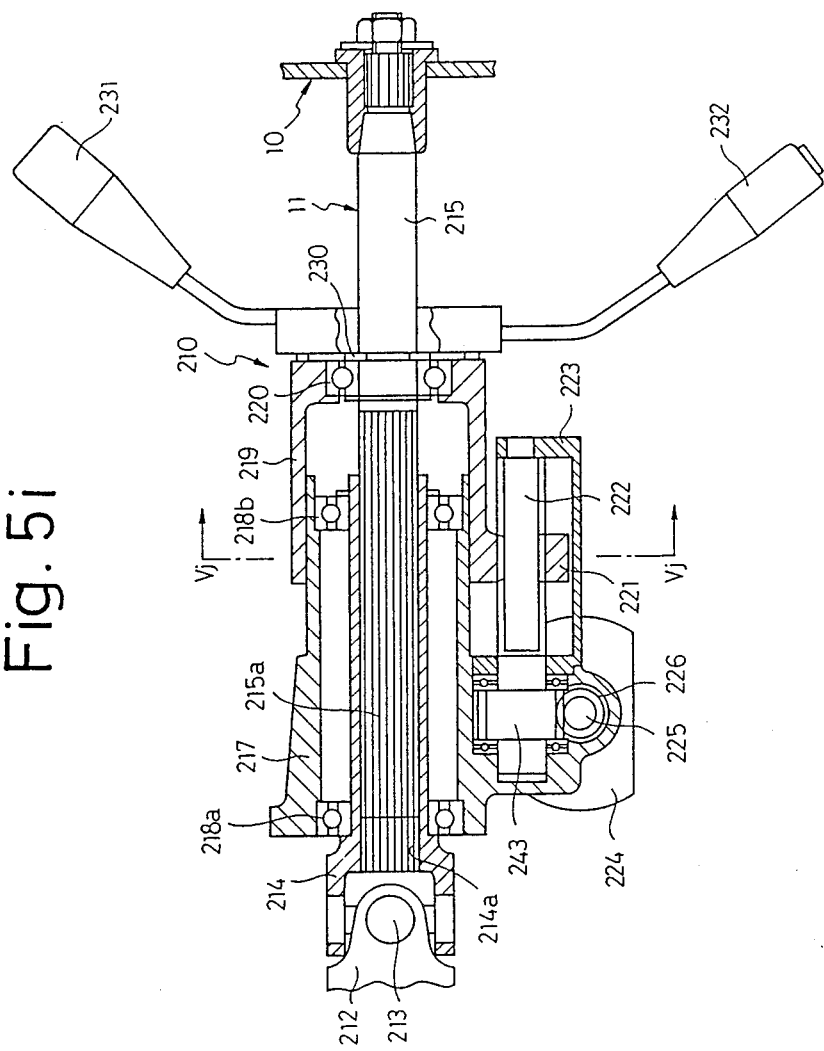

ATTITUDE CONTROLLING SYSTEM FOR VEHICLE-SUPPORTED EQUIPMENT

BACKGROUND OF THE INVENTION

The present invention relates to an attitude controlling system for vehicle-supported equipments which is capable of automatically locating a seat, steering operation member, etc. on a vehicle into a position where it is easy to drive during travel, or a position where one can easily get on and off the vehicle upon boarding and alighting.

In vehicles, a driver's seat, steering wheel, etc. are generally designed to be freely adjustable in their positions so that a driver of the vehicle may readily perform all of the required driving operations during travel. Usually, the driver's seat, steering wheel, etc. are set to have an attitude fit for driving. Specifically, during travel, the driver's seat and the steering wheel are located leaving a space only required for the driver to move his hands and legs. If left as they are, therefore, the steering wheel and a seat back obstruct the driver in getting on and off the vehicle, with the result that he can board and alight only with an unnatural pose.

For this reason, it is desirous that a tilt mechanism and a telescopic mechanism for the steering operation member are electrically automated to locate the steering operation member in a retreat position upon boarding and alighting, or a predetermined driving position during travel.

To automate such locating operations, the status of respective parts in an automobile must be monitored to detect a behavior of the driver and then judge whether the driver is about to board/alight or drive. Opening/-closing of a door, turn-on/-off of an ignition key, etc. are available for detecting such status.

However, a switch adapted to detect opening/closing of the door, turn-on/-off of the ignition key, etc. may possibly malfunction. Also, the door, the ignition key, etc. are sometimes erroenously set into an unintended state. Should the switch for such detection purpose malfunction due to a failure, failed contact or vibrations, there is a fear that the steering wheel, etc. would be retracted to a position for boarding and alighting even while the vehicle is traveling. When the steering wheel is set to have an attitude corresponding to its retreat position, it would become very difficult for the driver to continue driving. In superhighways, for example, the driver can not stop the vehicle immediately even under such a situation and this is very dangerous.

Furthermore, in case that the vehicle-supported equipment are located into a position for boarding/alighting or a position for driving in response to the opened/closed status of the door, if the attitude setting is effected after detection, the driver must wait for a while until he is actually permitted to alight, for example, because the driver is already about to get off the vehicle when the door has been opened. Particularly, in case of adjusting a plurality of attitudes, these plural attitudes can not be adjusted simultaneously from the point of reducing the load on a vehicle-mounted battery, with the result that the attitude setting takes a longer time.

SUMMARY OF THE INVENTION

A first object of the present invention is to completely prevent a steering wheel, etc. from being retracted into a boarding/alighting position erroneously in a possibly dangerous situation, and a second object thereof is to shorten a waiting time lapsed from the time when a driver has attempted to alight until the time when he is actually permitted to alight.

To achieve the above objects, according to the present invention, at least two factors which can be used to judge stopping of a vehicle or intention of boarding/alighting, such as the status of an engine key, vehicle speed, status of a parking brake and a shift lever position of a transmission, are monitored. Only when the two factors, preferably three or more factors, all indicate stopping of the vehicle or an alighting state, the vehicle-supported equipment are automatically positioned into a boarding/alighting attitude, and when they indicate release from a stopped state of the vehicle or the completion of boarding, the vehicle-supported equipment are automatically positioned into a driving attitude.

With this arrangement, since whether or not the vehicle is stopped, or whether the driver is about to board or alight is monitored using two or more detection means, the steering wheel, etc. will never be erroneously retracted into a boarding/alighting position during travel of the vehicle, even if one of the detection means be failed. As a result, safety is ensured. Further, there is no need of special switching operation and whether or not the vehicle is stopped can be detected as a result of normal driving operations, thereby giving no inconvenience. Moreover, if opening/closing of a door is not included in conditions used to detect whether or not the vehicle is stopped, the attitude setting will not be delayed upon alighting. Still more, the detection means can be constituted using the existing switches and hence requires no highly-reliable and expensive switches or the like.

In a preferred embodiment of the present invention, attitudes of a steering wheel and a seat are both automatically set into a boarding/alighting position and a driving position. More specifically, when stopping of the vehicle is detected, an attitude of the steering wheel is first set into a boarding/alighting position. Thereafter, the seat is set into its boarding/alighting position upon opening of the door, then it is set into a driving position upon closing (not full-closing) of the door, and finally the steering wheel is set into its predetermined driving position when the vehicle is released from a stopped state. This causes the respective members to be positioned without a delay in time, i.e., directly following the intention of the driver. The burden on a battery can be made small by shifting the attitude setting operations of a steering system and a seat system in timed relationship.

Meanwhile, in this type electrically automated apparatus, care must be taken about the risk that one's hand, foot or any other substances may be caught in the movable member during adjustment of its attitude. In this type apparatus, therefore, it is preferable to detect overload of a drive system and stop a drive motor if the overload is detected. Detection of overload has been conventionally made by monitoring a current passing through the drive motor. But, due to relatively large variations in the current value among individual motors as well as changes in the current value depending on ambient temperatures, etc., the decision process of overload becomes very difficult with such means and has poor reliability.

Therefore, a third object of the present invention is to improve the reliability of overload detection so as to minimize the degree of damage of the caught human body or substance even if it be carelessly caught in during adjustment of an attitude, thereby securing the safety of driving. To achieve the above object, in a preferred embodiment of the present invention, a position signal generator such as a potentiometer is used to sense the attitude of a member to be controlled (e.g., steering wheel) at all times. During adjustment of an attitude, the change speed of attitude is monitored and, when the monitored value has become less than a predetermined level, this is judged as a state of overload to effect the predetermined operation.

In case of a potentiometer, for example, its output issues a DC signal of level proportional to an attitude. If the change in speed of attitude is constant, the change in speed of an output level of the potentiometer is also constant. Usually, because of a constant output of the motor and a substantially constant magnitude of the load, the change in speed of attitude becomes constant. In the event any substance be caught in, the load is increased to reduce the change in speed of attitude. Accordingly, the presence or absence of overload can be judged positively by, for example, continuously sampling an output level of the potentiometer in a predetermined cycle and monitoring the difference in attitude information (analog levels), i.e., the change speed, between the successive samplings.

Meanwhile, a motor used in this type of electrically automated apparatus consumes substantial electric power. A power source of this type of apparatus relies on a battery and an electric generator both loaded on a vehicle. But, because the vehicle-loaded battery has a relatively small capacity, the discharge state continued for a long time causes an overdischarge and lowers the output voltage. The reduced output voltage of the battery gives rise a problem that an engine is brought into a start-up disable state. This situation must be avoided as much as possible.

Start-up of the engine simultaneously operates the vehicle-loaded electric generator, so that the battery is charged to supply a sufficient electric power. Accordingly, if the electric-powered attitude controlling system is allowed to operate only during run of the engine, the engine can be prevented from coming into a start-up disable state due to the reduced voltage of the battery.

However, the attitude setting allowed only during run of the engine accompanies a disadvantage as follows. In the system for automatically setting vehicle-supported equipment into a boarding/alighting attitude upon boarding/alighting and into a driving attitude after the completion of boarding, whether or not one is about to get on and off the vehicle must be detected. The conditions monitored to discriminate a boarding/alighting state and a driving state, such as insertion/removal of an engine key, put-on/-off of a parking brake, opening/closing of a door, etc. are all usually changed while the engine is stopped. Eventually, the automatic attitude setting can not be effected upon boarding/alighting.

Also in case of providing a manual switch to set a boarding/alighting attitude or a driving attitude dependent on the switch operation, to start the vehicle after boarding, one must wait until the steering wheel, etc. have been positioned into a driving attitude after start-up of the engine.

Therefore, a fourth object of the present invention is to provide an attitude controlling system for vehicle-loaded equipments which automatically judges the intention of boarding/alighting, then automatically positions the steering wheel, etc. into a boarding/alighting attitude upon boarding/alighting and into a driving attitude after boarding, respectively, and which can prevent the engine from coming into a start-up disable state due to overdischarge of the battery.

To achieve the above object, in a preferred embodiment of the present invention, the voltage of a vehicle-supported battery is monitored at all times and, before the battery voltage has been too lowered to start up the engine, the attitude controlling system is inhibited from operating.

In case of normal passenger cars, for example, batteries loaded thereon have the rated voltage of 12 V. But, the battery voltage is reduced fairly below that value in the event of overdischarge. Thus, by setting a threshold value at 10 V, for example, and inhibiting operation of the attitude controlling system when the battery voltage is reduced below 10 V, it becomes possible to prevent discharge of the battery before the battery has been too discharged to enable start-up of the enginge, thereby maintaining the engine in a start-up enable state. As a result, with the battery not in an overdischarge state, the attitude controlling system can be operated even while the engine is stopped, so that the setting to a boarding/alighting attitude and a driving attitude may be effected automatically dependent on insertion/removal of an engine key, put-on/-off of a parking brake, and other conditions.

Meanwhile, this type attitude controlling system is usually designed to have the capability of manual attitude adjustment in response to switch operation. In case of the vehicle including a manual switch for that purpose, however, the attitude controlling system may be sometimes operated continuously due to mischief of children, particularly while the vehicle is stopping. Such mischievous operation done during stopping of the engine enables the battery to be liable to come into an overdischarge state. Upon overdischarge of the battery, operation for the automatic attitude setting is inhibited in the present invention. For this reason, in a preferred embodiment of the present invention, there is provided a switch for instructing manual attitude adjustment, but its manual operation is inhibited during stop of the engine.

Other objects and effects of the present invention will be apparent from the following description with reference to the accompanying drawings.

BRIEF DESCRIPTION OF THE DRAWINGS

FIGS. 3a and 3b are a plan view and a front view of a sheet turning mechanism, respectively;

FIG. 3c is a sectional view taken along the line IIIC—IIIC in FIG. 3a;

FIG. 4a is a horizontal sectional view of a check lever attachment section of a door;

FIGS. 4b and 4c are sectional views taken along the line IVB—IVB and the line IVC—IVC in FIG. 4a, respectively;

FIGS. 5b and 5c are sectional views taken along the line Vb—Vb and the line Vc—Vc in FIG. 5a, respectively;

FIG. 5d is an enlarged front view as seen in the direction of Vd in FIG. 5c;

FIGS. 5e and 5f are sectional views taken along the line Ve—Ve and the line Vf—Vf in FIG. 5d, respectively;

FIG. 5g is an exploded perspective view of a screw and nut mechanism D;

FIG. 5i is a longitudinal view showing a telescopic steering mechanism;

FIG. 5j is a sectional view taken along the line Vj—Vj in FIG. 5i;

DESCRIPTION OF PREFERRED EMBODIMENTS

Hereinafter, preferred embodiments of the present invention will be described with reference to the drawings.

Figure 1:
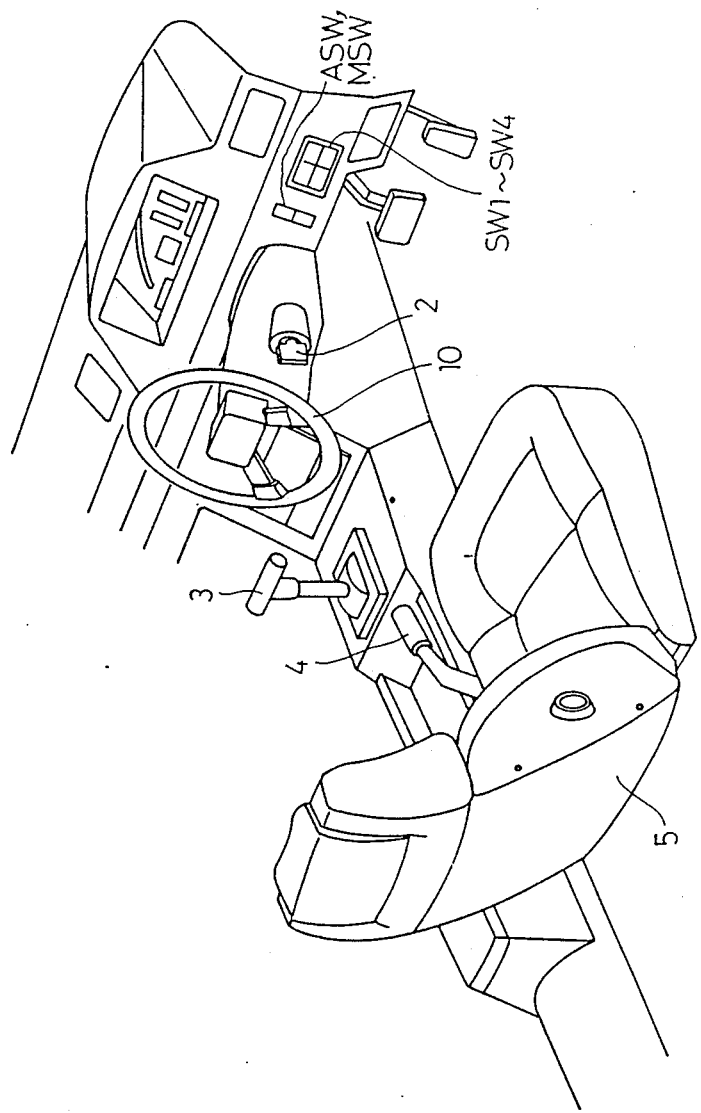
FIGS. 1 and 2 are perspective views showing a driver's seat and thereabout of an automobile mounting thereon a system of the present invention.
Figure 2:
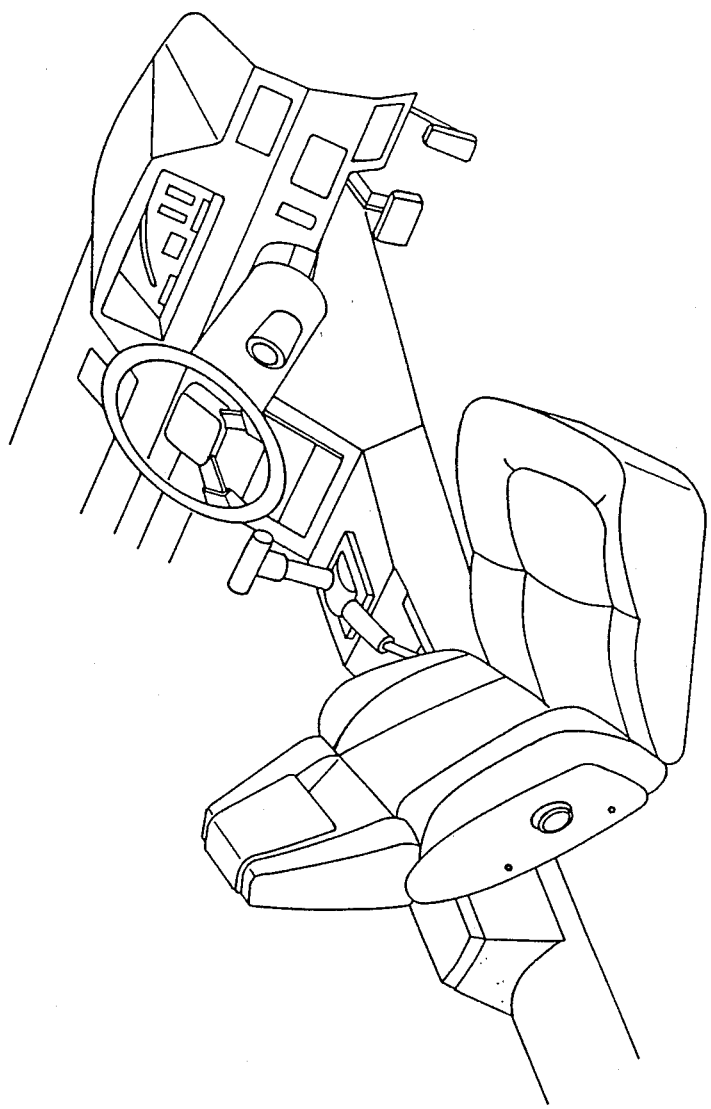

FIGS. 1 and 2 show a driver's seat and thereabout of an automobile mounting thereon an attitude controlling system for vehicle-supported equipment embodying the present invention. The attitude controlling system of this embodiment includes a tilt steering mechanism for adjusting a tilt angle of a steering wheel 10, a telescopic steering mechanism for adjusting a length of a rotatable shaft of the steering wheel 10, and a seat turning mechanism for turning a seat 5 about a vertical axis. The state shown in FIG. 1 represents a normal driving attitude, and the state shown in FIG. 2 represents a boarding/alighting attitude.

In this embodiment, when setting into a boarding/alighting attitude, the steering wheel 10 is set into a tilt-away position (or upper limit position of the tile mechanism) and the seat 5 is turned to direct toward a boarding/alighting door, as shown in FIG. 2. The telescopic steering mechanism is set to have an attitude in a predetermined position.

Switches SW1-SW4 are manual switches used for adjusting a tilt angle of the steering wheel 10 and a length of its rotatable shaft by manual operation. A switch ASW is an automatic mode switch used for setting whether or not the attitude setting for boarding-/alighting should be made automatically upon boarding/alighting. A switch MSW is a manual put-away switch used for instructing to set a boarding/alighting attitude under particular conditions. In addition to the above, a select switch for selecting the conditions of attitude setting for automatic boarding/alighting is provided in a not shown position (or position where the switch is hard to operate).

In FIG. 1, designated at 2 is an ignition key (i.e., engine key), 3 is a shift lever of a transmission (automatic speed change type in this embodiment), and 4 is a parking brake lever.

A seat base supporting the seat 5 is secured to a rotary mount 122 which is located below the seat 5 and is pivotally connected to a base 123, so that the seat 5 is turnable by as much as 30 degrees together with the rotary mount between a driving attitude shown in FIG. 1 and a boarding/alighting attitude shown in FIG. 2.

The rotary mount 122, the base 123 and other parts provided below the seat 5 are shown in FIG. 3a in a plan view, in FIG. 3b in a front view and in FIG. 3c in a sectional view taken along the line IIIC—IIIC in FIG. 3a, respectively. Referring now to these figures, a shaft rod 125 penetrates through a hole in the base 123 and has its distal end secured to the rotary mount 122. The base 123 is formed on the circumference about the shaft rod 125 with a plurality of semispherical recesses 126 for receiving balls, and a steel ball 127 is placed in each recess 126 and retained by a ring 128 welded to the base 123. The ring 128 serves to prevent the steel ball 127 from slipping out of position. The plurality of recesses and steel balls are arranged on the circumference about the shaft rod 125 with predetermined angular spacings therebetween. The base 123 supports the steel balls 127 which in turn bear the rotary mount 122.

As seen from FIG. 3c, the shaft rod 123 has a gear 129 secured thereto and a worm (not shown) is mechanically connected to the gear 129. A DC motor 130 (M1 in FIG. 6) has its rotating shaft mechanically connected to the worm through a bevel gear (not shown). Note that an attitude detection potentiometer PM1 later described is also connected to the worm. Forward rotation of the DC motor 130 turns the rotary mount 122 clockwisely and backward rotation thereof turns the same counterclockwisely. Between the rotary mount 122 and the base 123, there are provided brake means $132_1$, $132_2$ for applying frictional resistance to rotation of the rotary mount 122 when it is in a driving attitude, as well as brake means $133_1$, $133_2$ for applying frictional resistance to rotation of the rotary mount 122 when it is in a boarding/alighting attitude.

FIG. 4a shows a horizontal section of a check lever attachement section of a door 110. Referring to FIG. 4a, the door 110 has a door check 135 secured thereto through which penetrates a check lever 136 having its one end pivotally connected to a vehicle body. Incidentially, the door 110 is pivotally connected to the vehicle body by a pair of upper and lower hinges so that it is turnable within a range of AR2.

FIGS. 4b and 4c show a section taken along the line IVB—IVB in FIG. 4a and a section taken along the line IVC—IVC in FIG. 4a, respectively. Referring to these figures, a stop 137 and a striker 138 are secured to the other end of the check lever 136, i.e., the end thereof penetrating through the door check 135 and then entering a space defined between outer and inner covers of the door 10 (or interior space of a door cover). The door 110 also includes an engager 139 which is slidably fitted over a guide bar 140 and pushed by the striker 138 while engaging therewith in a range from a half-open position to a full-closed position of the door during movement of the striker 138 in conjunction with the door pivoting from a full-open position to a full-closed position. The engager 139 is urged by a coil spring 141 toward the door check 135. But, as shown in FIG. 4c, the engager 139 hits against an arm (stop) supporting the guide bar 140 in a position where the striker 138 strikes against the engager 139 when the door is half-opened, so that the enaager 139 may not move toward the door check 135 beyond that position. A permanent magnet 142 is secured to the engager 139, and a reed switch (door switch) DSW is disposed, as shown in FIG. 4c, in a position where it faces the magnet 142 when the engager 139 is in its stopped position on the side near the door check 135. Thus, as will be seen from FIG. 4c, the permanent magnet 142 remains opposite to the reed switch DSW during the time when the door 110 pivots from a full-open position to a half-open position, causing the reed switch DSW to detect the magnetic field of the magnet 142 and output a door open signal (of ground level) and, when the opening degree of the door 110 becomes equal to or less than a half of the full-open range, the magnet 142 is then moved rightward (in FIG. 4c) and the reed switch DSW outputs a door closed signal (of high level).

Figure 5A:
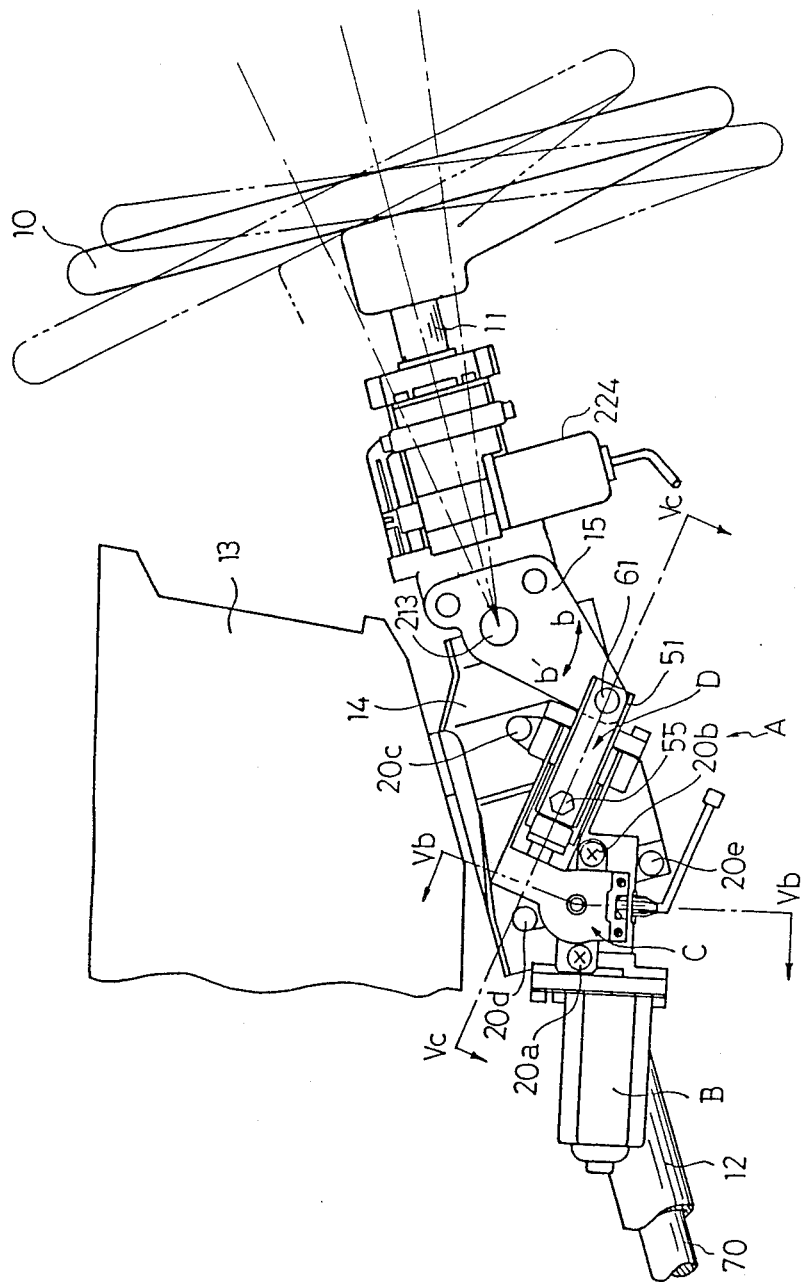
FIG. 5a is a schematic view of a steering operation section as seen from the left.

FIG. 5a shows a schematic arrangement of a steering operation section when viewed from the left, FIG. 5b shows a section taken along the line Vb—Vb in FIG. 5a, FIG. 5c shows a section taken along the line Vc—Vc in FIG. 5a, FIG. 5d shows an end view when viewed in the direction of Vd in FIG. 5c, FIG. 5e shows a section taken along the line Ve—Ve in FIG. 5d, FIG. 5f shows a section taken along the line Vf—Vf in FIG. 5e, and FIG. 5g shows an exploded perspective view of a screw and nut mechanism D.

Referring first to FIG. 5a, an upper main shaft 11 having the steering wheel 10 mounted thereon is designed to be adjustable in its angle with respect to a lower main shaft 70. A tilt steering mechanism A comprises a breakaway bracket 14 attached to a vehicle body 13 below its portion constituting a dashboard, a DC motor B (M2 in FIG. 6) attached to the bracket 14, a reduction mechanism C coupled to the DC motor B, a screw and nut mechanism D coupled to the reduction mechanism C, and an upper bracket 15 pivotally connected to the breakaway bracket 14 to be pivoted through the screw and nut mechanism D.

Referring now to FIG. 5b, a worm 17 is fixed to the distal end of an output shaft 16 of the DC motor B and a worm wheel 18 of the reduction mechanism C is in mesh with the worm 17.

The reduction mechanism C functions to reduce the number of revolutions of the DC motor B and transmit the enlarged torque to the screw and nut mechanism D. Looking into concrete arrangement of the reduction mechanism C, the worm wheel 18 receiving the torque transmitted from the DC motor B is fixed to a shaft 19 which is rotatably supported on opposite side walls of a housing 20 and a cover 36 through bearing bushes 21, 22. A gear 23 is fixed to the shaft 19 and meshed with a gear 25 fixed to the end of a screw shaft 24 of the screw and nut mechanism D.

A potentiometer PM2 shown in FIG. 5b is connected to a certain shaft in the reduction mechanism C. The potentiometer PM2 detects a rotation angle of the gear 23 and hence an inclination angle of the upper main shaft 11, i.e., a tilt angle of the steering wheel 10.

The screw and nut mechanism D will now be described by referring to FIG. 5c. The screw shaft 24 is rotatably supported on the housing 20 and a stationary member 34 fixed to the housing 20 through a pair of bearings 31, 32. The housing 20 is fixed to the breakaway bracked 14 by means of bolts 20c, 20d and 20e shown in FIG. 5a. The gear 25 is splined at 35 to the end of the screw shaft 24 for corotation with the screw shaft 24.

The cover 36 is fixed to the housing 20 so as to cover the gear 25. Meshed with a male thread portion 24a of the screw shaft 24 is a female thread portion 38a of a nut 38 of a nut member 37. As shown in FIGS. 5d, 5e and 5f, the nut member 37 comprises resin-made nut 38 and metal-made retaining members 39, 40, these parts 38 and 39, 40 being integrally molded in advance and assembled into the screw shaft 24.

The retaining members 39, 40 are formed on their opposite side surfaces with circular sectioned portions 39a, 40a which have male thread portions 39b, 40b tapped on the distal ends thereof, respectively. Further, the nut 38 is formed with radial slits 38b, 38c, as shown in FIG. 5f, and left and right halves of the nut 38 in FIG. 5f are coupled to each other through a thin wall portion 38d at the outer periphery thereof. The nut 38 is so configured from the reason that, when assembled as shown in FIG. 5c, the nut 38 should produce a radial urging force directing toward the screw shaft 24.

On the opposite end outer peripheral portions of the nut 38 of the nut member 37, there are provided push means 41A, 41B for urging the nut 38 radially inwardly.

One push means 41A comprises a rubber-made tubular push member 41 and a metal-made holder 43 on the outer periphery thereof, whereas the other push means 41B comprises a rubber-made tubular member 42 and a metal-made holder 44 on the outer periphery thereof.

Referring to FIG. 5e, the nut 38 is formed in its outer peripheral surface with two annular grooves 38e, 38f in which are fitted annular ribs 41a, 42a formed on the inner peripheral surfaces of the rubber-made tubular push members 41, 42, respectively. This arrangement serves to prevent the push members 41, 42 from axially slipping out of position with respect to the nut 38. For the similar purpose, the push members 41, 42 are formed in their outer peripheral surfaces with annular grooves 41b, 42b in which are fitted annular ribs 43a, 44a on the inner peripheral surfaces of the holders 43, 44, respectively.

Over the circular sectioned portions 39a, 40a of the metal-made retaining members 39, 40, as shown in FIG. 5c, there are fitted links 51, 52 at their one ends which are pivotally connected thereto by nuts 55, 56, through washers 53, 54, respectively. Designated at 51a, 52a are bent portions of the links 51, 52. Note that, as shown in FIG. 5g, the holders 43, 44 are fixedly coupled with each other by two plates 57, 58 and each pair of bolts 59, 60 to prevent them from axially slipping out of position.

The links are pivotally connected at their other ends to the end of the upper bracket 15 through boss members 64, 65 using a bolt 61, washer 62 and a nut 63, as shown in FIG. 5c.

Accordingly, when the DC motor B is driven to rotate, the torque is transmitted through the output shaft 16, worm 17, worm wheel 18, gear 23, gear 25 and the screw shaft 24 in this order, thereby rotating the screw shaft 24 about its axis at low speeds. This causes the nut member 37 meshed with the shaft 24, tubular push members 41, 42 and the holders 43, 44 to be moved as one piece in the axial direction of the shaft 24. As a result, the links 51, 52 are also moved in the same direction to pivot the upper bracket 15, so that the steering wheel 10 is inclined.

Figure 5H:
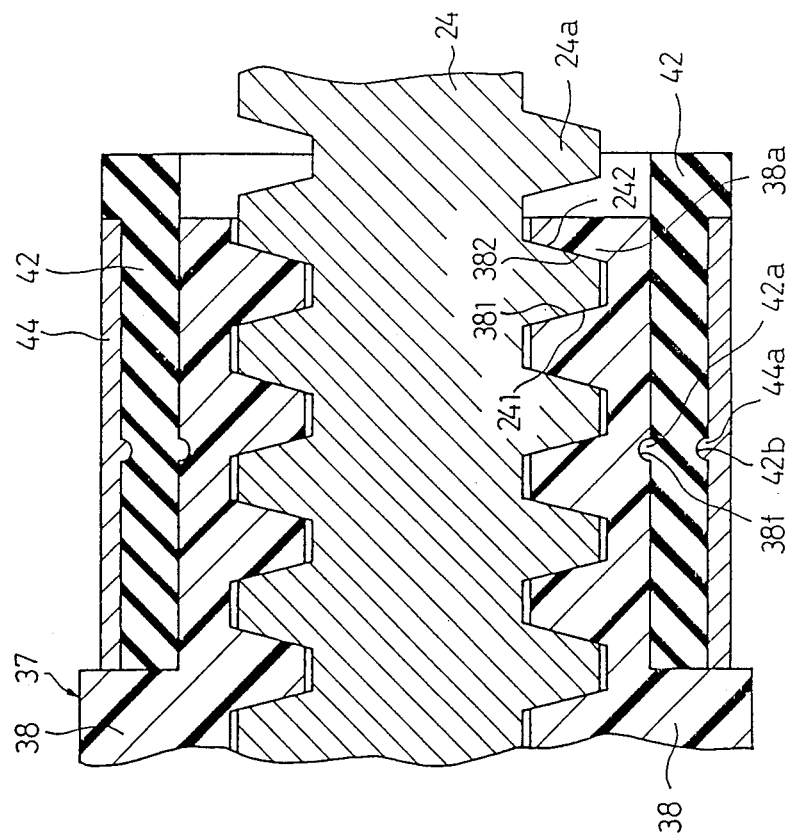
FIG. 5h is an enlarged sectional view showing a screw shaft 24 and a nut 38 in a meshed state.

The screw shaft 24 and the nut 38 of the screw and nut mechanism D in a meshed state are shown in FIG. 5h. In this embodiment, the nut 38 has therein the slits 38b, 38c and is radially urged toward the center by the metal-made holders 43, 44 through the elastic rubber-made tubular push members 41, 42 on the outer periphery of the nut 38. With this arrangement, there will never produce a gap even under any operating conditions between adjacent thread slants 241, 242 of the male thread portion 24a facing each other and female thread slants 38a, 38s in abutment therewith. The resin-made nut 38 is advantageous in points of noises and wear.

FIG. 5i shows an arrangement of the telescopic steering mechanism located nearer to the steering wheel 10 than the above tilt steering mechanism, and FIG. 5j shows a section taken along the line Vi—Vi in FIG. 5i. The telescopic steering mechanism will now be described by referring to these figures.

The upper main shaft 11 comprises a shaft 212, a hollow outer shaft 214 coupled to the shaft 212 through a joint shaft 212 serving as the tilt center, and an inner shaft 215 fitted in the outer shaft 214 to be axially movable. The shaft 212 has its leftward end (on the figure) coupled to a not shown steering gear. Also, the inner shaft 215 has its rightward end (on the figure) including a serrated portion formed thereon with which is engaged a supporitng member of the steering wheel 10. Accordingly, when the steering wheel 10 is turned, the inner shaft 215 and the outer shaft 214 are both rotated through axially extending serrated portions 214a, 215a formed on the outer peripheral surface of the inner shaft 215 and the inner peripheral surface of the outer shaft 214, thereby rotating the main shaft 212.

The outer shaft 214 is rotatably supported by a pair of bearings 218a, 218b on a stationary bracket 217 journalled to the vehicle body through a not shown shaft. The inner shaft 215 is supported on a movable bracket 219 through a bearing 220. The movable bracket 219 is movable in the left and right dircction on the figure with the left end portion thereof fitted over the outer periphery of the right end portion of the stationary bracket 217 as shown in FIG. 5i. The right end portion of the movable bracket 219 holds the bearing 220 in cooperation with a stop ring 230 locked to the inner shaft 215.

The movable bracket 219 is provided on the lower surface of its leftward end with a nut portion 221, and a screw 222 meshed with the nut portion 221 is rotatably supported to the rightward end of the stationary bracket 217. Further, a supporting bracket 223 is secured to the stationary bracket 217. The supporting bracket 223 serves to cover the screw 222 and secure a space in which the screw 222 is movable (see FIG. 5j).

Figure 6:
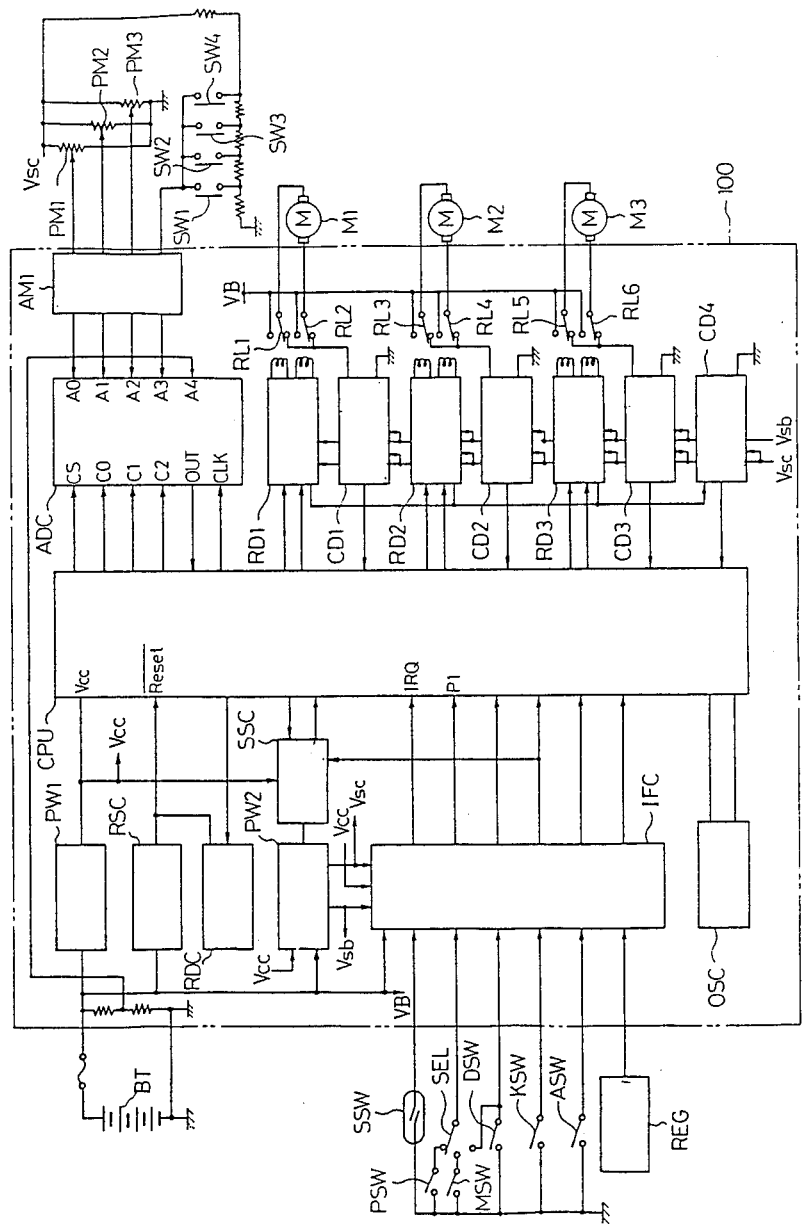
FIG. 6 is a block diagram showing an electric circuit of the attitude controlling system according to one embodiment.

A gear 243 is integrally fitted over the left end portion of the screw 222 and meshed with a worm gear 226 attached to a shaft 225 of a DC motor 224 (M3 in FIG. 6). Note that the DC motor 224 is attached to the stationary bracket 217. Accordingly, the screw 222 is turned upon rotation of the motor 224. This causes the nut portion 221 to axially move over the screw 222. The movable bracket 219 having the nut portion 221 then advances or retracts with respect to the stationary bracket 217. As a result, the inner shaft 215 is moved with respect to the outer shaft 214 in a telescopic fashion.

Incidentially, the inner shaft 215 holds a pair of switch units 231, 232 which are mechanically fixed to the movable bracket 219.

FIG. 6 shows an electric circuit of the attitude controlling system for vehicle-loaded equipments which is mounted on the automobile shown in FIG. 1. Referring to FIG. 6, an electronic controller 100 includes a microcomputer CPU, power source circuits PW1, PW2, reset circuit RSC, run-away detection circuit RDC, standby signal circuit SSC, interface circuit IFC, oscillation circuit OSC, A/D converter ADC, relay drivers RD1, RD2 and RD3, overcurrent detection circuits CD1, CD2, CD3 and CD4, amplifiers AM1, relays RL1, RL2, RL3, RL4, RL5 and RL6, etc.

The microcomputer CPU used in this embodiment is of Model MB8850 made by Fujitsu. This microcomputer CPU is a single-chip microcomputer of 4-bit configuration which includes predetermined read only memory ROM and read/write memory RAM, and which also incorporates therein a timer/counter. The number of I/O ports is 37 at maximum. Because of the configuration with the C-MOS process, it is able to hold the content of the read/write memory RAM with small power consumption in a standby mode.

The power source circuit PW1 converts an electric power supplied from the vehicle-loaded battery BT to the constant voltage of +5 V, the reset circuit RSS generates a reset signal upon power-on, the run-away detection circuit RDC generates a reset signal in the absence of an incoming pulse signal for a predetermined time, and the power source circuit PW2 produces the predetermined voltages Vsb, Vsc. The standby signal circuit sets the CPU in a standby mode to turn off the source output from the PW2, upon receiving a standby signal from the CPU (the standby signal being generated after a predetermined time subsequent to the completion of put-away operation). The interface circuit IFC produces a set of signals of TTL (transistor transistor logic) levels corresponding to status of the various switches.

Furthermore, the oscillation circuit OSC produces clock pulses applied to the micrcomputer CPU, and the relay drivers RD1, RD2 and RD3 control each a pair of relays connected thereto in accordance with an instruction from the CPU. The overcurrent detection circuits CD1, CD2 and CD3 monitor the presence or absence of overcurrents passing through DC motors M1, M2 and M3 through the relays RL1/RL2, RL3/RL4 and RL5/RL6, respectively, and the overcurrent detection circuit CD4 monitors the presence or absence of overcurrents passing through relays in relay drivers RD1, RD2 and RD3.

The A/D converter ADC used in this embodiment has five analog input channels and selects any one of them in accordance with status of control terminals C0, C1 and C2. The converted digital data is issued from an output terminal OUT in the form of a serial signal in synchronous relation with clock pulses applied to a terminal CLK. A terminal CS is used for chip selection.

Switches and so on connected to the interface circuit IFC will now be described. Designated at SSW is a vehicle speed sensor. More concretely, it is a reed switch arranged in the vicinity of a permanent magnet connected to a speed meter cable. Thus, while the vehicle is running, the switch SW is caused to open and close correspondingly. In this embodiment, a signal comprising four pulses for each rotation of the meter cable is generated. An output terminal of the vehicle speed sensor SSW is connected to an external interrupt terminal IRQ of the CPU through the interface circuit IFC. PSW is a parking switch which is caused to open and close in conjunction with the parking brake lever 4.

Designated at MSW is a manual put-away switch used to instruct manual put-away operation. DSW is a door switch which is caused to open and close upon opening/closing of the door as previously mentioned. SEL is a select switch used to select any one of boarding/alighting attitude conditions in an automatic mode. Any one of the parking switch PSW, manual put-away switch MSW and the door switch DSW is connected to an input port P1 of the CPU through the interface circuit IFC. Designated at KSW is a key switch (so called an unlock warning switch) which is caused to open and close in accordance with insertion and removal of the engine key 2. ASW is an automatic mode switch used to instruct whether an automatic boarding/alighting attitude setting mode is to be effective or ineffective upon boarding/alighting. A regulator REG serves to stabilize the output of an alternator (electric generator) coupled to an output shaft of the engine.

The DC motor M1 for driving the seat is connected to the relays RL1, RL2, the DC motor M2 for driving the tilt mechanism is connected to the relays RL3, RL4, and the DC motor M3 for driving the telescopic mechanism (telescope) is connected to the relays RL5, RL6.

Output terminals of potentiometers PM1, PM2 and PM3 for detecting an attitude of the seat, a tilt attitude of the steering wheel and a telescopic attitude thereof are connected to input channels A0, A1 and A2 of the A/D converter through the amplifier AM1, respectively. The manual attitude setting switches SW1, SW2, SW3 and SW4 have their one ends connected to respective taps of a resistance divider in turn connected to a power source line, and their other ends commonly connected and led to an input channel A3 of the A/D converter ADC. Finally, an output terminal of a resistance divider connected to the output of the battery BT is connected to an input channel A4 of the A/D converter ADC.

Accordingly, by selecting the predetermined channel and reading an output from the A/D converter, the microcomputer CPU is able to know an attitude of the seat, a tilt attitude of the steering wheel, a telescopic attitude thereof, status of the manual attitude setting switches (SW1-SW4), as well as output voltage of the battery BT.

FIGS. 7a, 7b, 7c, 7d, 7e, 7f, 7g, 7h and 7i show general operation of the microcomputer CPU. Hereinafter, operation of the system will be described by referring to these figures. Before entering the details, important registers, flags, etc. employed in FIGS. 7a-7h will first be listed as follows.

Put-away flag (AF) . . . this is set to 1 during put-away operation, i.e., setting operation to a boarding/alighting attitude.

Return flag (RF) . . . this is set to 1 during return operation, i.e., operation for returning from a boarding-/alighting attitude to a driving attitude.

Tilt refresh flag . . . this is set to 1 when the stored driving attitude for the tilt mechanism is updated.

Telescope refresh flag . . . this is set to 1 when the stored driving attitude for the telescoic mechanism is updated.

Tilt reverse flag . . . this is set to 1 if overload is detected in the tilt mechanism, and cleared to 0 after reverse through predetermined strokes, after reverse for a predetermined time, or upon detection of a predetermined attitude.

Telescope reverse flag . . . similar to the tilt reverse flag.

Tilt stop flag . . . this is set to 1 if motor lock (overcurrent), time-out or overload (too small change speed of attitude) is detected.

Telescope stop flag . . . similar to the tilt stop flag.

Top dead center flag (UF) . . . this is set to 1 when an attitude of the tilt mechanism is judged as at the top dead center.

Bottom dead center flag (DF) . . . this is set to 1 when an attitude of the tilt mechanism is judged as at the bottom dead center.

Longest point flag (LF) . . . this is set to 1 when an attitude of the telescopic mechanism is judged as at the longest point.

Shortest point flag (SF) . . . this is set to 1 when an attitude of the telescopic mechanism is judged as at the shortest point.

Tilt timer . . . a timer used to know a driving time of the tilt mechanism, which counts up by one for each lapse of 80 msec.

Telescope timer . . . a timer used to know a driving time of the telescopic mechanism, which counts up by one for each lapse of 80 msec.

Seat timer . . . a timer used to know a driving time of the seat driving mechanism, which counts up by one for each execution of timer interrupt.

80 msec counter . . . this counts up by one for each execution of timer interrupt and counts up from zero once again after counting for a time of 80 msec.

Vehicle speed timer . . . a timer used to measure a cycle of a signal issued from the vehicle sensor SSW from its rising to its falling, which coutns up by one for each lapse of 80 msec.

Tilt reverse timer . . . this counts a period of time lapsed from the time when the tilt mechanism reverse flag has been set to one, and is cleared to zero when the counted time reaches t3.

Telescope reverse timer . . . similar to the tilt reverse timer.

Seat reverse timer . . . similar to the tilt reverse timer.

Stand-by timer . . . a timer used to make the CPU standby, which generates a standby signal after the lapse of a predetermined time t'.

Figure 7A:
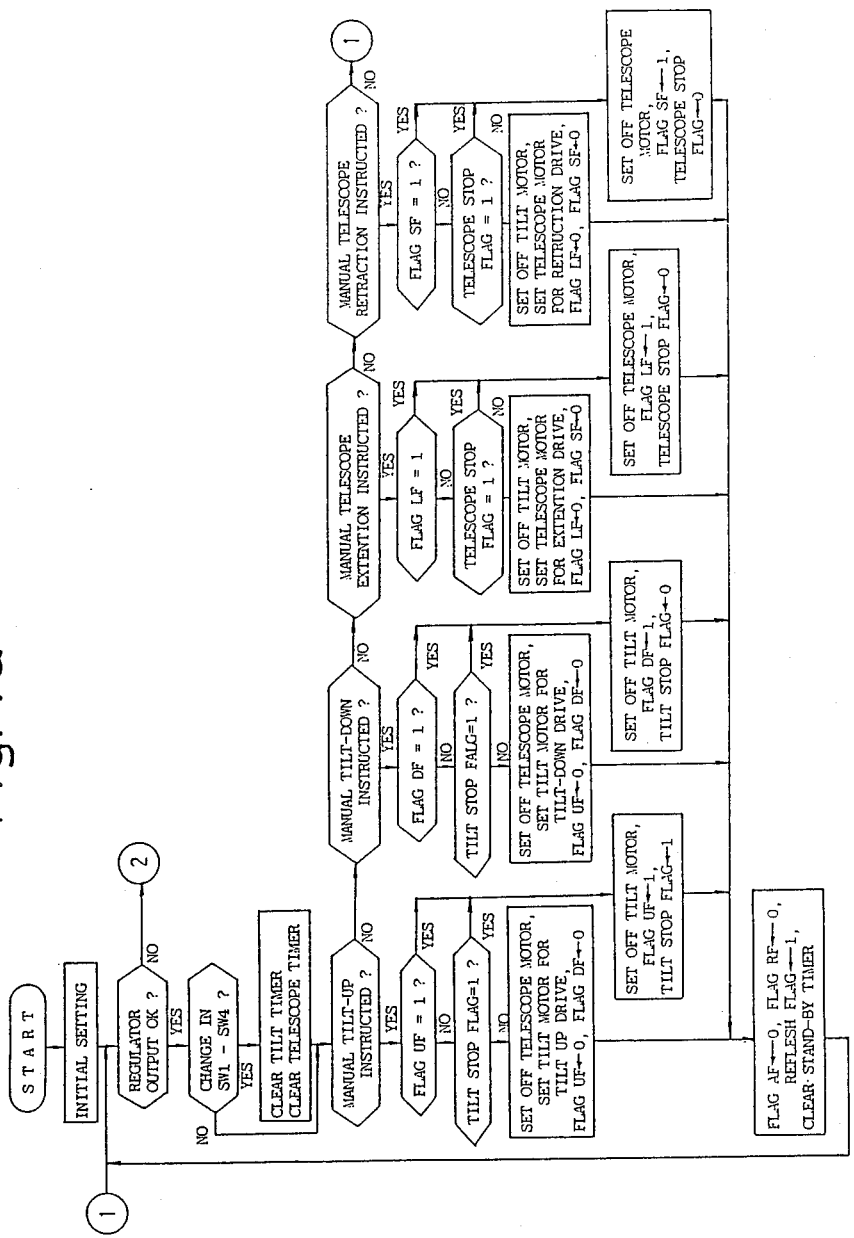
FIGS. 7a, 7b, 7c, 7d, 7e, 7f, 7g, 7h and 7i are flow charts showing general operation of a microcomputer CPU in FIG. 6.
Figure 7B:
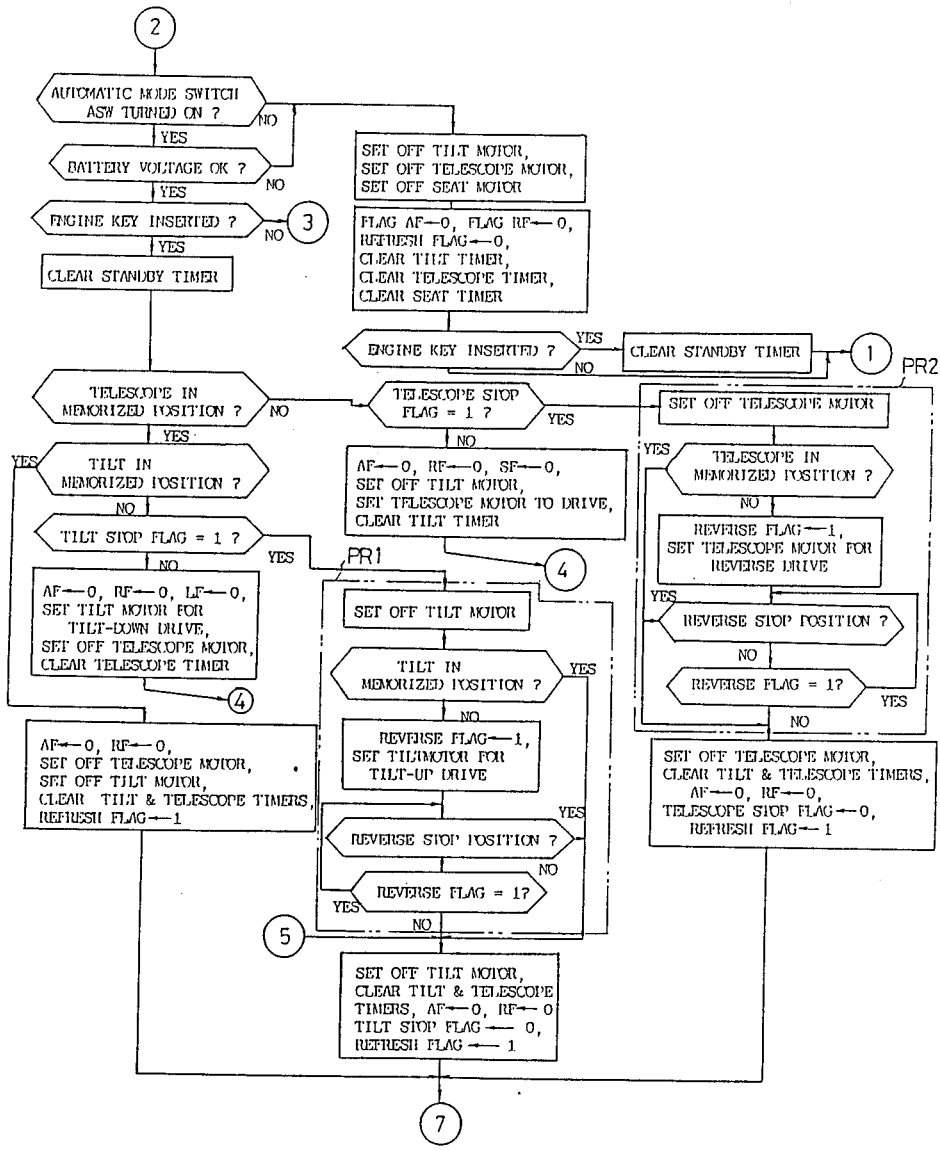
Figure 7C:
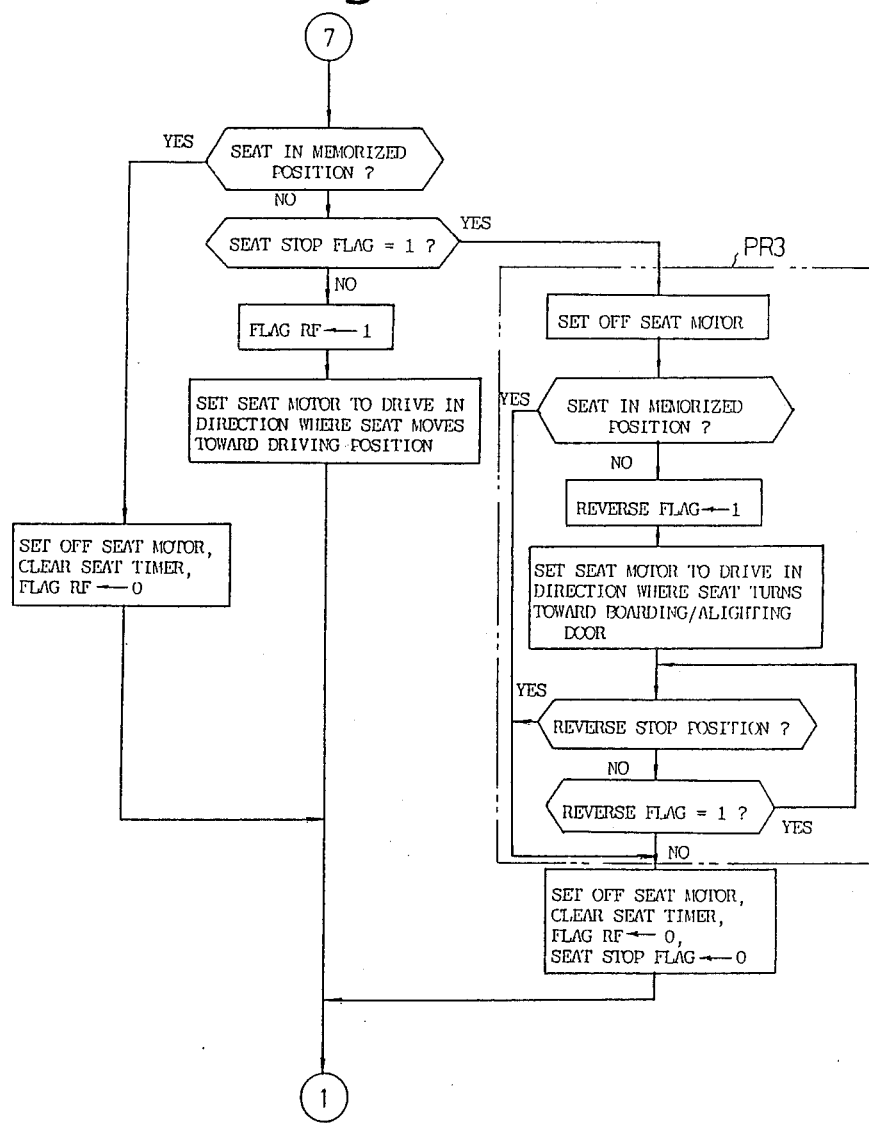
Figure 7D:
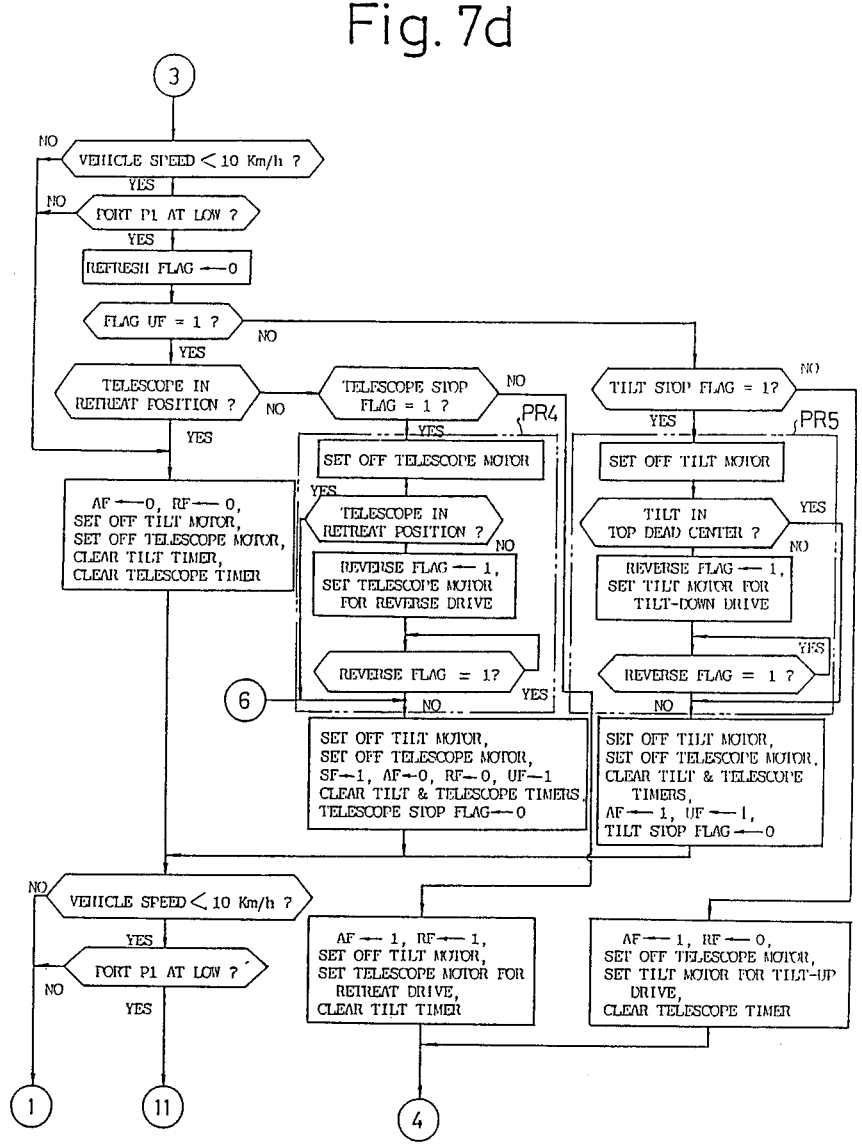
Figure 7E:
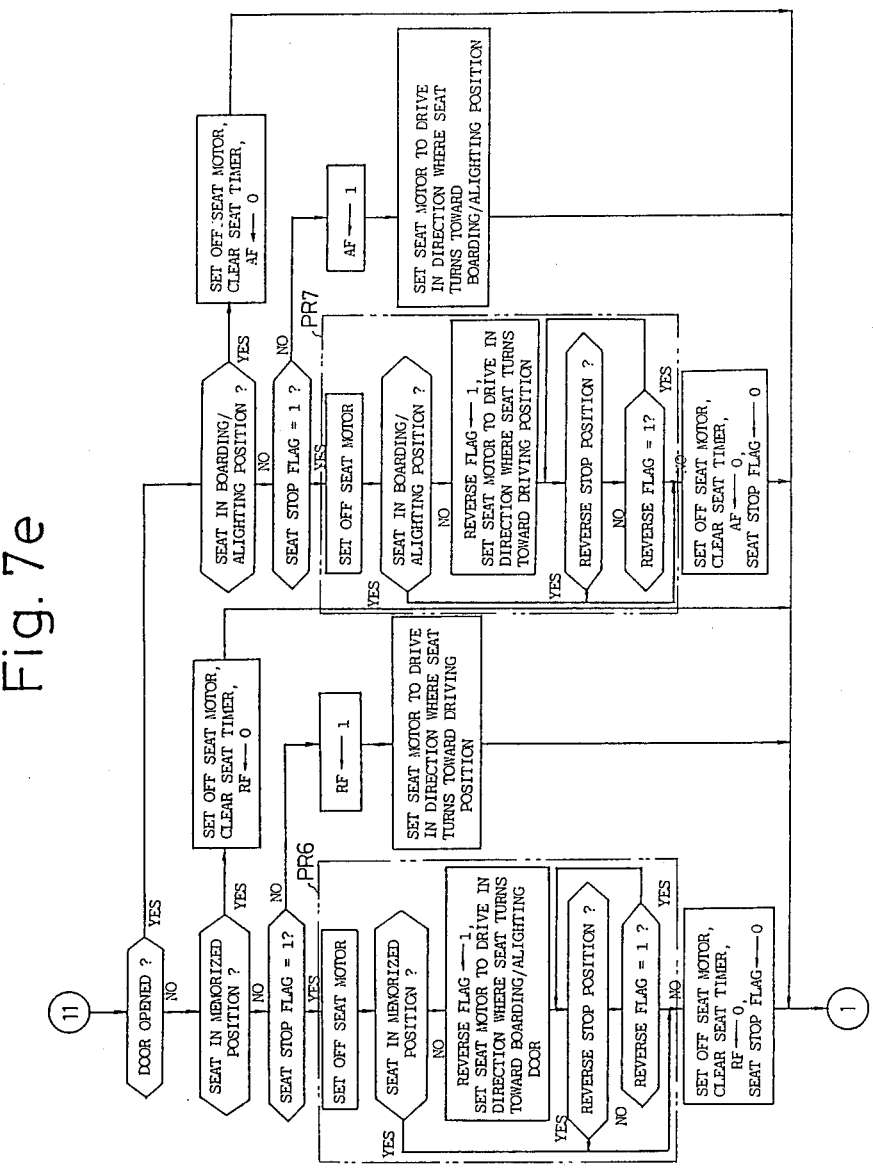
Figure 7F:
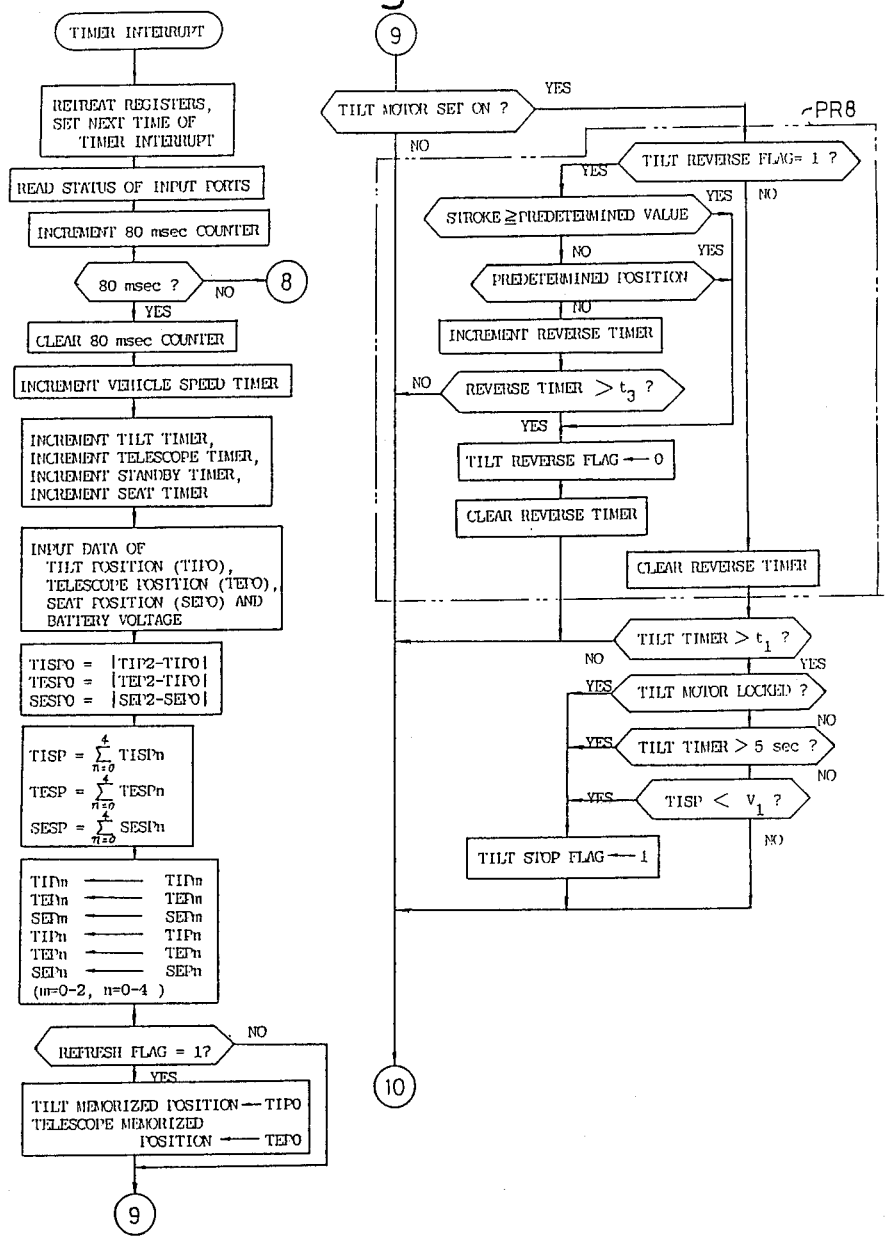
Figure 7G:
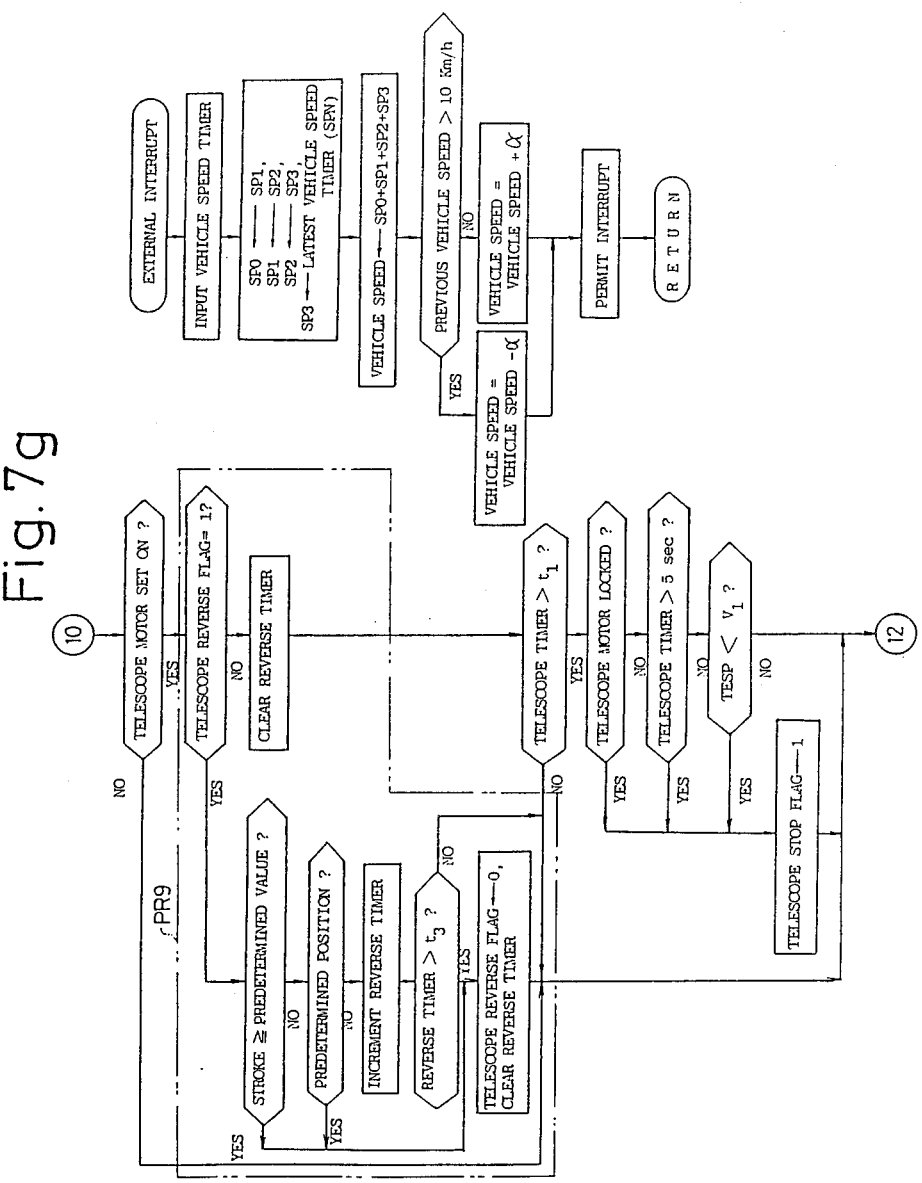
Figure 7H:
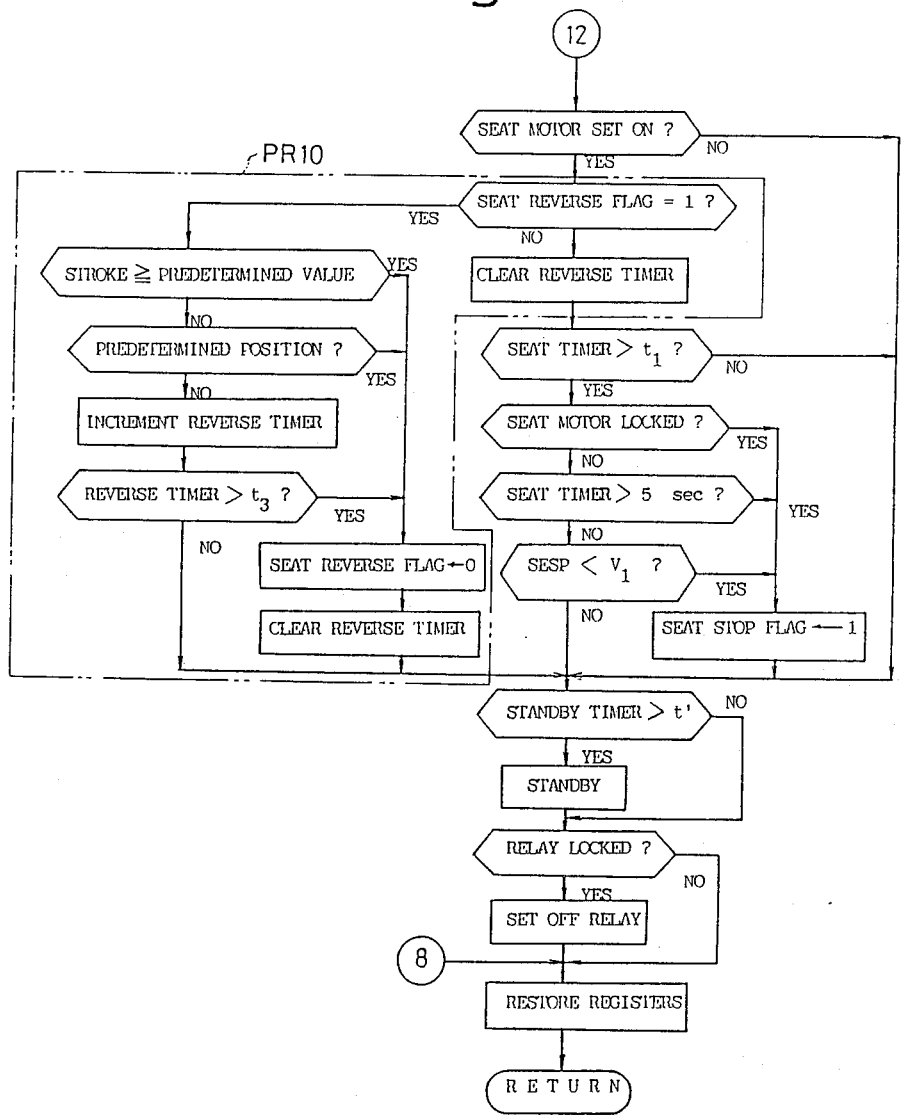
Figure 7I:
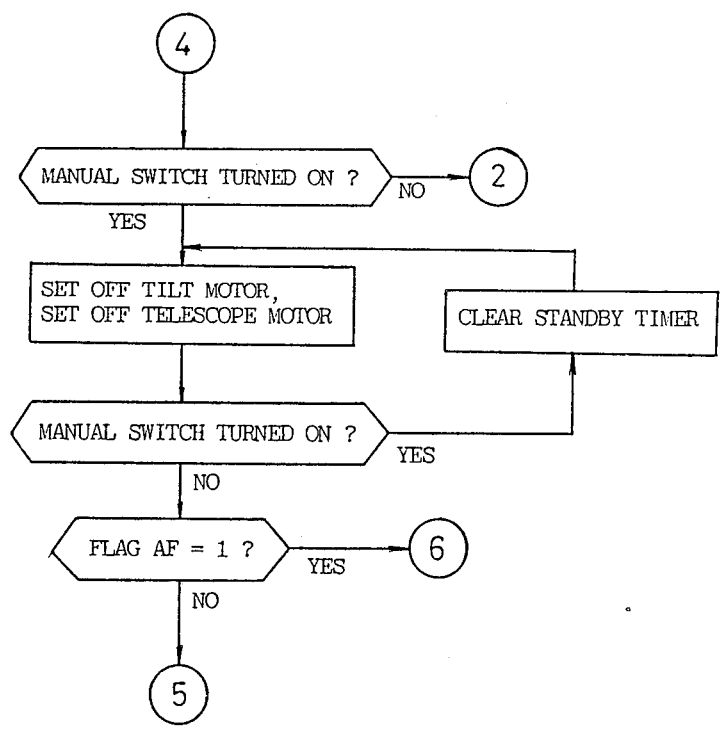

When powered on, the microcomputer CPU executes the process of a main routine shown in FIG. 7a from its start. Apart from this process, it also executes two other processes. One is an external interrupt process in accordance with an external interrupt from the vehicle speed sensor SSW (see FIG. 7g), and the other is a timer interrupt process which is to be executed everywhen the internal timer counts up a predetermined value (see FIG. 7f). In this embodiment, the timer interrupt occurs for each 5 msec.

The external interrupt will first be described. To put it briefly, this interrupt performs the process of measuring a vehicle speed. The value of the vehicle speed timer is cleared to zero everywhen the external interrupt process is performed. Also, the value of the vehicle speed timer is counted up for each execution of the timer interrupt process per 5 msec. Accordingly, the value of the vehicle speed timer upon occurrence of the external interrupt always represents a period of time lasped from the completion of previous interrupt to the present time.

In this embodiment, since the external interrupt is occurred at falling of the vehicle speed signal, the value of the vehicle speed timer corresponds to a time of one cycle of the vehicle speed signal. In practice, to avoid an influence of variations in duty of the sensor, sampling is made four times to detect the average valuc thereof. For this purpose, there are employed four vehicle speed registers SP0, SP1, SP2 and SP3. Everywhen the external interrupt process id executed, the contents of the registers SP3, SP2 and SP1 are transferred to the registers SP2, SP1 and SP0, respectively, and the latest vehicle speed enters the register SP3.

Then, the contents of the four regisgers SP0–SP3 are added and the resulting sum is regarded as a measured vehicle speed. Note that the resulting value represents a cycle of vehicle speed pulses and hence, contrary to the normal vehicle speed, the larger value corresponds to the lower vehicle speed.

The timer interrupt will now be described. When the internal timer of the microcomputer counts up 5 msec, the process flow jumps to a start of the timer interrupt shown in FIG. 7f. The microcomputer then retreats the contents of the respective registers, sets the next time timer interrupt, reads status of the respective input ports, and increments the 80 msec counter by one.

If the value of the 80 msec counter does not yet reach 80 msec, the CPU immediately restores the contents of the registers and returns to the main routine. But, if the counter value has reached 80 msec, it executes the following process.

First, the value of the 80 msec counter is cleared, and the vehicle speed timer, tilt timer, telescope timer and the seat timer are incremented by one. The A/D converter ADC is then controlled to read a tilt attitude, telescopic attitude, seat attitude, battery voltage, and status of manual attitude setting switches (SW1–SW4).

Next, an average speed of attitude change is determined from the resulting attitude information. The process for a tilt attitude will first be described. In this embodiment, there are provided four tilt attitude registers TIPm (m=0–3) to hold tilt attitude information of four times readings and five tilt speed registers TISPn (n=0–4) to hold tilt speed information of five times readings.

The latest tilt attitude is entered in the register TIP0, the previous tilt attitude is entered in the TIP1, and the two times before tilt attitude is entered in the TIP2, respectively. In this embodiment, the difference in value (absolute value) between the two times before attitude and the latest attitude is entered in the tilt speed register TISP0. The previous tilt speed, the two times before tilt speed, . . . are entered in other tilt speed registers TISP1, TISP2, . . . , respectively. Then, five data of tilt speed information are added and the resulting value is stored as a measured result of the tilt speed into a register TISP. Thereafter, the contents of the tilt attitude registers TIP(m) are transferred to the registers TIP(m+1), and the contents of the tilt speed registers TISP(n) are transferred to the registers TISP(n+1), respectively.

The processes for a telescopic attitude and a seat attitude are similar to that for a tilt attitude. Namely, TEP(m) denotes telescopic attitude registers, TESP(n) denotes telescopic speed registers, SEP(m) denotes seat attitude registers, and TESP(n) denotes seat speed registers.

With the tilt refresh flag and the telescope refresh flag set at one, the contents of the tilt attitude register TIP0 and the telescopic attitude register TEP0 are stored in memories as newly stored attitudes.

Next, the presence or absence of overload is monitored and stop conditions for the reverse operation upon detection of overload is judged for each of the tilt mechanism, telescopic mechanism and the seat driving mechanism.

There will first be described the process for the tilt mechanism. With the tilt motor M2 turned off, the process flow goes ahead directly. With the tilt motor M2 turned on, the process flow proceeds to overload detection because the tilt reverse flag is normally set to zero. But, if the value of the tilt timer is less than a predetermined time t1, overload detection is masked to avoid detection a rush current upon turn-on of the motor.

If the tilt timer has the value larger than t1, the following three conditions are judged. First one is detection of a large current sensed by the overcurrent detection circuits CD1–CD3. This condition occurs in the event the motor is locked, for example. Second one is an overflow of the tilt timer. The attitude setting is normally completed for as long as several seconds, but the motor may be driven continuously for a longer time in the occurrence of abnormality. In this embodiment, therefore, if the tilt driving time reaches 5 sec, this is judged to be abnormal.

Third one is a change speed of tilt attitude. The information on a change speed of tilt attitude is stored in the register TISP as previously mentioned. In the normal operation, the attitude information is changed at a certain slope during drive of the motor. Therefore, the value of the register TISP is compared with a predetermined value preset in the program and, if the attitude change speed is lower than a predetermined value, this is judged as detection of overload.

When at least one of those three conditions is judged to be abnormal, the tilt stop flag is set to one.

In the main routine, as described later, the tilt reverse flag is set to one upon setting of the tilt stop flag to one. When the tilt reverse flag is turned to one, the process flow proceeds to judgement of stop conditions for the reverse operation. In this embodiment, there are three conditions to be judged. The highest priority is given to the number of strokes.

More specifically, the attitude at the time when overload has been detected is compared with the present attitude and, if the resulting number of strokes reaches a predetermined value, a reverse mode is released. Normally, the motor is stopped with this judgement. Another condition is that a predetermined attitude has been reached, and the remaining condition is that a reverse mode time has reached a predetermined value (t3) (i.e., time-out).

If any one of those conditions is satisfied, the tilt reverse flag is cleared to zero and the tilt reverse timer is cleared.

Next, the CPU proceeds to the process for the telescopic mechanism. Similarly to case of the tilt mechanism, it goes ahead directly with the telescope motor M3 turned off. With the motor M3 turned on and the telescope reverse flag set at zero, it proceeds to overload detection. Also in this case, three conditions, i.e., detection of an overcurrent, overflow of the telescope timer and change speed of telescopic attitude are judged and, if even any one of those conditions is judged to be abnormal (overload), the telescope stop flag is set to one.

In the main routine, as described later, the telescope reverse flag is set to one upon setting of the telescope flag to one. When the telescope reverse flag is set to one, judgement of reverse stop conditions is made. There are similarly three conditions to be judged. If any one of the conditions that the reverse stroke exceeds a predetermined value, that the telescopic attitude has come into a predetermined state and that the reverse time has reached a predetermined time t3 is satisfied, the telescope reverse flag is cleared to zero and the telescope reverse timer is cleared.

Next, the CPU proceeds to the process for the seat driving mechanism. Similarly to case of the tilt mechanism, it goes ahead directly with the seat motor M1 turned off. With the motor M1 turned on and the seat reverse flag set at zero, it proceeds to overload detection. Also in this case, three conditions, i.e., detection of an overcurrent, overflow of the seat timer and change speed of seat attitude are judged and, if even any one of those conditions is judged to be abnorml (overload), the seat stop flag is set to one.

In the main routine, as described later, the seat reverse flag is set to one upon setting of the seat stop flag to one. When the seat reverse flag is set to 1, judgement of reverse stop conditions is made. There are similarly three conditions to be judged. If any one of the conditions that the reverse stroke exceeds a predetermined value, that the seat attitude has come into a predetermined state and that the reverse time has reached a predetermined time t3 is satisfied, the seat reverse flag is cleared to zero and the seat reverse timer is cleared.

Then, an output of the overcurrent detection circuit CD4 is viewed to check whether or not an overcurrent passes through the relays RL1-RL6 and, if the presence of an overcurrent is detected, the relays are turned off.

Subsequently, the main routine beginning with step of "START" in FIG. 7a will be described.

When powered on, the CPU first executes the initial setting. More specifically, it sets the output ports to the initial status (motors turned off), and clears the content of the memories which are used as counters, registers, flags, etc. Note that the information on a tilt attitude and a telescopic attitude previously stored in the memories are rewritten to predetermined values.

Then, an output of the regulator REG is checked. During run of the engine, the predetermined voltage (battery voltage) appears at the regulator REG, but during stop of the engine, the appearing voltage becomes zero. Accordingly, whether or not the engine is operating is judged by monitoring the output of the regulator REG. During run of the engine, manual attitude adjustment are permitted in response to operation of the manual attitude setting switches SW1-SW4.

With status of the switched SW1-SW4 changed, the contents of the tilt timer and the telescope timer are both cleared. Upon a manual tilt-up instruction (turn-on of the SW1), the telescope motor M3 is set off, the tilt motor M2 is set to drive in the tilt-up direction, and the flags UF and DF are both cleared to zero. Further, the put-away flag AF and the return flag RF are cleared to zero, the refresh flag is set to one, and the standby timer is cleared.

With the above setting, the motor M2 is driven during the time the switch SW1 remains in a turn-on state, so that the tilt mechanism adjusts an attitude of the steering wheel in the tilt-away (tilt-up) direction little by little. But, if the tilt stop flag is set to one upon detection of overload, etc., the tilt motor M2 is turned off, the flag UF is set to one and the tilt stop flag is cleared to zero. In this state, the motor M2 will not operate unless the flag UF is cleared, whereby the attitude will not change any more even with the switch SW1 pushed continuedly.

Upon a manual tilt-down instruction (turn-on of the SW2), the telescope motor M3 is set off, the tilt motor M2 is set to drive in the tilt-down direction, and the flags UF and DF are both cleared to zero. Further, the put-away flag AF and the return flag RF are cleared to zero, the refresh flag is set to one and the standby timer is cleared.

With the above setting, the motor M2 is driven during the time the switch SW2 remains in a turn-on state, so that the tilt mechanism adjusts an attitude of the steering wheel in the tilt-down direction little by little. But, if the tilt stop flag is set to one upon detection of overload, etc., the tilt motor M2 is turned off, the flag DF is set to one and the tilt stop flag is cleared to zero. In this state, the motor M2 will not operate unless the flag DF is cleared, whereby the attitude will not change any more even with the switch SW2 pushed continuedly.

Upon a manual a manual telescope extension instruction (turn-on of the SW3), the tilt motor M2 is set off, the telescope motor M3 is set to drive in the telescope extending direction, and the flags LF and SF are both cleared to zero. Further, the put-away flag AF and the return flag RF are cleared to zero, the refresh flag is set to one, and the standby timer is cleared.

With the above setting, the motor M3 is driven during the time the switch SW3 remains in a turn-on state, so that the telescopic mechanism extends the shaft of the steering wheel little by little in the direction in which the telescope is extended. But, if the telescope stop flag is set to one upon detection of overload, etc., the telescope motor M3 is turned off, the flag LF is set to one and the telescope stop flag is cleared to zero. In this state, the motor M3 will not operate unless the flag LF is cleared, whereby the attitude will not change any more even with the switch SW3 pushed continuedly.

Upon a manual telescope retraction instruction (turn-on of the SW4), the tilt motor M2 is set off, the telescope motor M3 is set to drive in the telescope retracting direction, and the flags LF and SF are both cleared to zero. Further, the put-away flag AF and the return flag RF are cleared to zero, the refresh flag is set to one, and the standby timer is cleared.

With the above setting, the motor M4 is driven during the time the switch SW4 remains in a turn-on state, so that the telescopic mechanism retracts the shaft of the steering wheel little by little in the direction in which the telescope is retracted. But, if the telescope stop flag is set to one upon detection of overload, etc., the telescope motor M3 is turned off, the flag SF is set to one and the telescope stop flag is cleared to zero. In this state, the motor M3 will not operate unless the flag SF is cleared, whereby the attitude will not change any more even with the switch SW4 pushed continuedly.

In this embodiment, the CPU proceeds to the automatic attitude setting operation in a state that the output of the regulator REG is zero, i.e., the engine is stopped. According to this embodiment, however, the automatic attitude setting operation is cancelled in such cases that the automatic mode switch ASW is turned off and that the voltage of the battery BT is abnormal. The battery voltage less than 10 V is judged to be abnormal in this embodiment. Specifically, because the battery voltage is lowered down to as low as 10 V before the engine has become hard to start up due to overdischarge of the battery, the automatic attitude setting is inhibited for safety if the battery voltage is lowered less than that value.

The automatic attitude setting operation is cancelled by setting off the tilt motor M2, telescope motor M3 and the seat motor M1, clearing the put-away flag AF, return flag RF and the refresh flag to zero, and clearing the tilt timer, telescope timer and the seat timer. With the engine key 2 inserted in the key cylinder (i.e., the KSW turned on), the stand-by timer is also cleared. In case that an automatic mode is set (the ASW is turned on), the battery voltage is normal and the engine key 2 is not inserted in the key cylynder (the KS is turned off), the process flow proceeds to ③ in FIG. 7d. Further, with the vehicle speed less than 10 Km/h and the input port P1 at a low level L, it is judged that there is the intention of boarding/alighting. Usually, the select switch SEL is set to select the parking switch PSW, so that status of the parking brake is input to the input port P1.

In this state, therefore, the presence of the intention of boarding/alighting is judged if the automatic mode switch ASW is turned on, the battery voltage is normal, the vehicle speed is less than 10 Km/h and the engine key is removed. Note that, in case the parking brake can not be employed in cold areas or for other reasons, the select switch SEL is set to select the manual put-away switch MSW or the door switch DSW. In this case, the presence of the intention of boarding/alighting is judged upon turn-on of the manual put-away switch MSW (momentary type) or opening of the door.

When the presence of the intension of boarding/alighting is judged, the put-away flag AF is set to one, the return flag is cleared to zero, the telescope motor M3 is set off, tilt motor M2 is set to drive in the tilt-up direction, and the telescope timer is cleared. With the above setting, the tilt position reaches the top dead center in several seconds and undergoes restriction in its movement, whereby overload is detected and the tilt stop flag is set to one. Upon setting of the tilt stop flag to one, the tilt motor M2 is turned off.

If the tilt position has not yet reached the top dead center at the time when the motor M2 is turned off, it is conceivable that any substance is caught in, or so. Therefore, the reverse flag is set to one and the tilt motor M2 is set to drive in the tilt-down (reverse) direction. Note that, upon setting one to the reverse flag, the attitude information at the time of detection of overload is memorized for monitoring of reverse strokes.

After being set to one as mentioned above, the reverse flag is cleared to zero if any one of such conditions as detection of predetermined strokes, detection of a predetermined position and detection of time-out is satisfied. The tilt motor M2 is reversely driven during the time the reverse flag remains one.

In case the tilt position has reached the top dead center, or when the reverse flag is set to zero, the tilt motor M2 and the telescope motor M3 are set off, the tilt and telescope timers are cleared, the flags AF and UF are set to one, and the tilt stop flag is cleared.

When the flag UF is set to one, the telescope position is then set to a retreat position. Although a retreat position (boarding/alighting attitude) is decided at the top dead center for the tilt mechanism, the shortest position is not always a preferable retreat position for the telescope. In this embodiment, therefore, a predetermined position decided for each vehicle is set as a retreat position for the telescope. Incidentially, the tilt mechanism and the telescopic mechanism are separately operated in this embodiment for the purpose of reducing the battery load, but it is also possible to operate them simultaneously.

First, the flag AF is set to one, the flag RF is set to zero, the tilt motor M2 is set off, the telescope motor M3 is set to drive in the direction in which it moves toward a predetermined retreat position, and the tilt timer is cleared. With this state continued for a while, the telescope position reaches a retreat position memorized previously. Upon reaching such a boarding/alighting attitude, the flags AF and RF are cleared to zero, the tilt motor and the telescope motor are set off, and the tilt and telescope timers are cleared. If overload is detecting during driving of the telescope motor M3, the telescope stop flag is set to one. Thus, similarly to case of the tilt mechanism, the motor is stopped (usually) after adjusting the attitude in the reverse direction by predetermined strokes.

In this connection, if any one of the manual switches SW1-SW4 is turned on during automatic adjustment of a tilt attitude and a telescopic attitude, this is regarded as instruction to stop and the tilt motor M2 and the telescope motor M3 are set off.

Next, status of the door switch DSW is checked. When opening of the door is detected, the seat is positioned into a boarding/alighting attitude. More specifically, first the put-away flag AF is set to one and the seat motor M1 is set to drive in the direction in which the seat moves toward the boarding/alighting door. The seat attitude is monitored and, when it assumes a predetermined boarding/alighting attitude, the seat motor M1 is turned off, the seat timer is cleared and the put-away flag AF is cleared to zero.

If overload is detected during driving of the seat, the seat stop flag is set to one. In this case, after setting off the seat motor M1, the reverse flag is set to one and the seat motor M1 is set to drive in the reverse direction, similarly to case of other mechanisms. Then, upon setting of the reverse flag to zero, the motor M1 is stopped.

When closing (not full-closing) of the door is detected, this is judged as a driving state to set one to the return flag RF and set the seat motor M1 to drive in the direction in which the seat moves toward a driving position. Upon coincidence of the seat attitude with a memorized position, i.e., driving position, the seat motor M1 is turned off, the seat timer is cleared and the return flag RF is cleared zero. If overload is detected during return driving of the seat attitude, the seat motor M1 is set to drive reversely and, when any predetermined condition is satisfied, the motor M1 is stopped similarly to case of the above other attitude setting operation.

When the engine key 2 is inserted in the key cylinder, this is judged as a driving state to set the tilt mechanism, telescopic mechanism and the seat driving mechanism into their respective driving attitudes. First, in case of the telescopic mechanism not in its driving attitude, the put-away flag AF is set to zero, the return flag RF is set to one, the telescope short flag SF is set to zero, the tilt motor is set off, the telescope motor is set to drive in the direction in which the attitude moves toward a memorized driving position, and the tilt timer is cleared. Upon coincidence of the telescopic attitude with a predetermined memorized driving attitude, the telescope motor is turned off.

Then, in case of the tilt mechanism not in its driving attitude, the put-away flag AF is set to zero, the return flag RF is set to zero, the telescope long flag LF is set to zero, the tilt motor is set to drive in the direction in which the attitude moves toward a memorized driving attitude, and the telescope timer is cleared. Upon coincidence of the tilt attitude with a predetermined driving position, the flags AF and RF are cleared to zero, the tilt motor M2 and the telescope motor M3 are set off, the tilt and telescope timers are cleared, and the refresh flag is set to one.

Next, in case of the seat not in its driving attitude, the return flag RF is set to one and the seat motor M1 is set to drive in the direction in which the seat moves toward a driving position. Upon coincidence of the seat attitude with a driving attitude, the seat motor M1 is turned off, the seat timer is cleared and the return flag RF is cleared to zero.

Although in the above embodiment the vehicle-mounted seat is turned upon boarding/alighting to direct the seat toward the boarding/alighting door, the boarding/alighting attitude may be set by aliding the seat in the longitudinal or transverse direction of the vehicle.

Figure 8:
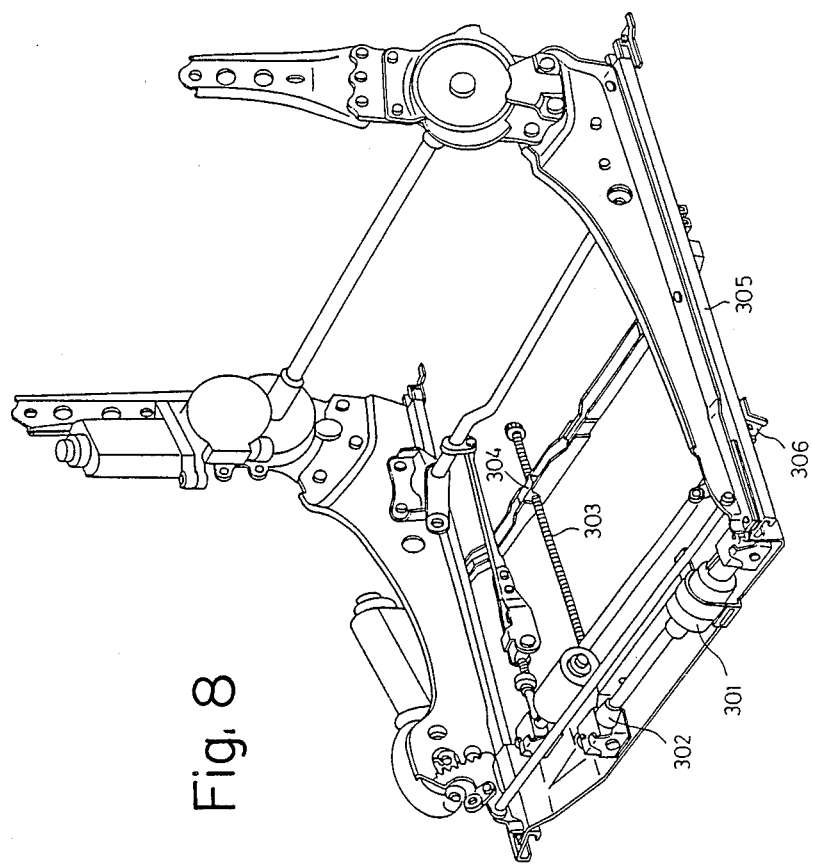
FIG. 8 is a perspective view showing a seat sliding mechanism.

FIG. 8 shows one example of a mechanism for sliding the seat longitudinally in an electric-powered manner. Referring to FIG. 8, a seat sliding motor 301 has its output shaft coupled to a screw 303 through a reduction gear box 302. A pair of slide rails 305 are provided below the seat base and slidably supported on stationary rails 306 fixed to the vehicle body.

A nut 304 is meshed with the screw 303. The gear box 302 and the screw 302 are secured to the seat base, while the nut 304 is secured to the stationary rail 306. Thus, when the motor 301 is driven, the screw 303 is turned through the gear box 302 and moved relative to the nut 304, thereby sliding the seat base.

Figure 9:
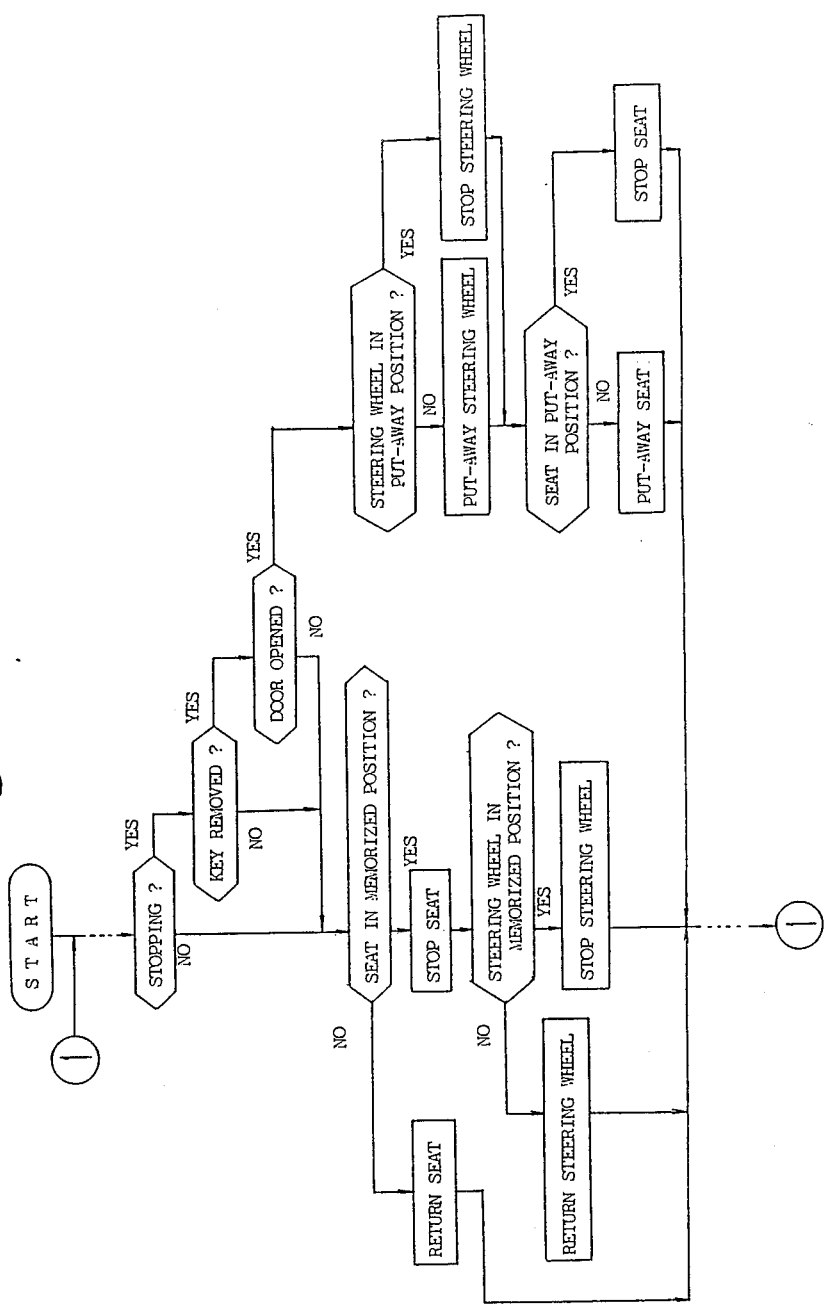
FIGS. 9, 10, 11 and 12 are flow charts showing general operations in modified embodiments of the present invention.

FIGS. 9, 10, 11 and 12 show example of operation for the attitude controlling system used in case of sliding the seat. Referring first to FIG. 9, in this embodiment, if the vehicle is stopped, the engine key is removed and the door is opened, this is judged as a boarding/alighting state, whereupon the steering mechanism and the seat driving mechanism are set into their respective boarding/alighting put-away positions. If even any one of the boarding/alighting detection conditions becomes unsatisfied, this is judged as a driving state, whereupon the seat driving mechanism and the steering mechanism are returned to their respective driving attitudes.

Figure 10:
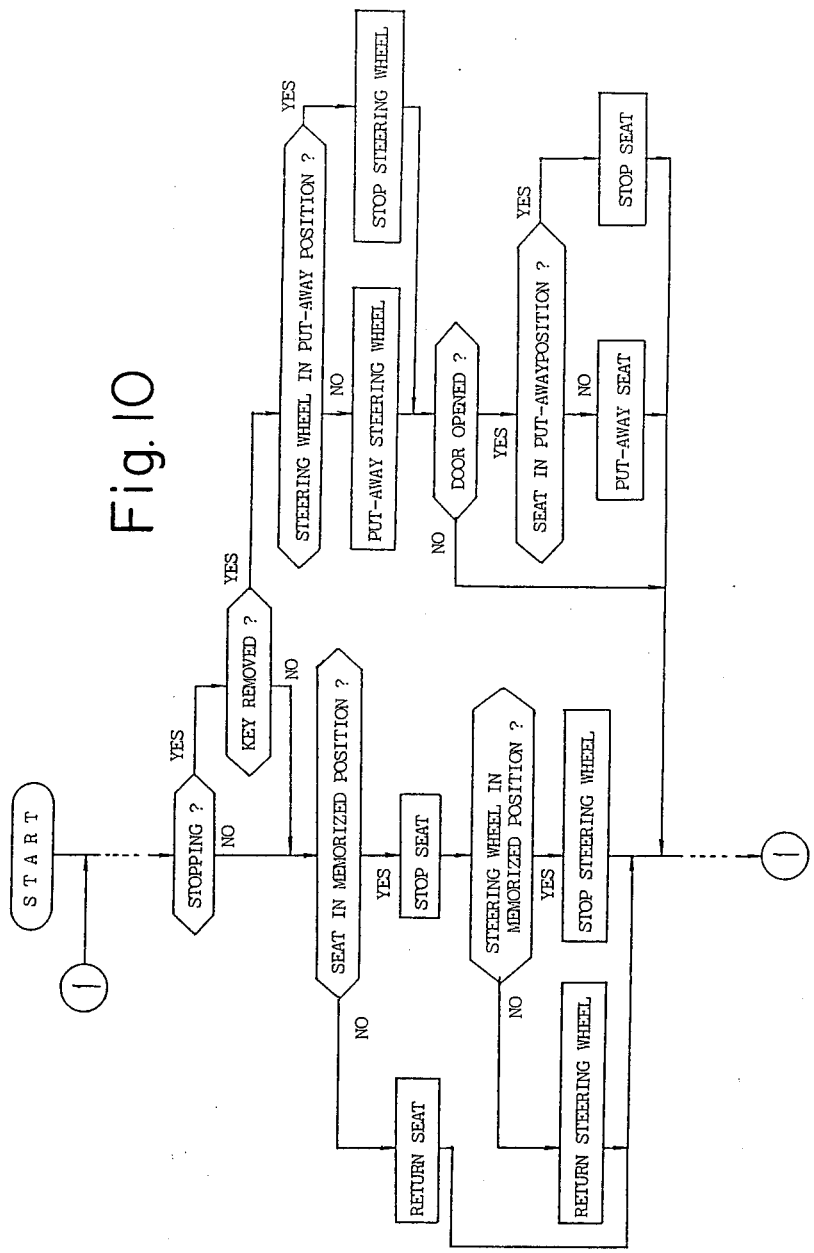

Referring to FIG. 10, in this embodiment, if the vehicle is stopped and the engine key is removed, the steering mechanism is set into a boarding/alighting put-away position. Further, if the door is opened, the seat is then set into a boarding/alighting attitude. According to this embodiment, the seat is returned at the time not when the door is closed, but when either one condition of stopping of the vehicle and removal of the engine key becomes unsatisfied. In the foregoing embodiment where the seat is turned, such operation is not feasible because the seat must be returned to a driving attitude before full-closing of the door.

Figure 11:
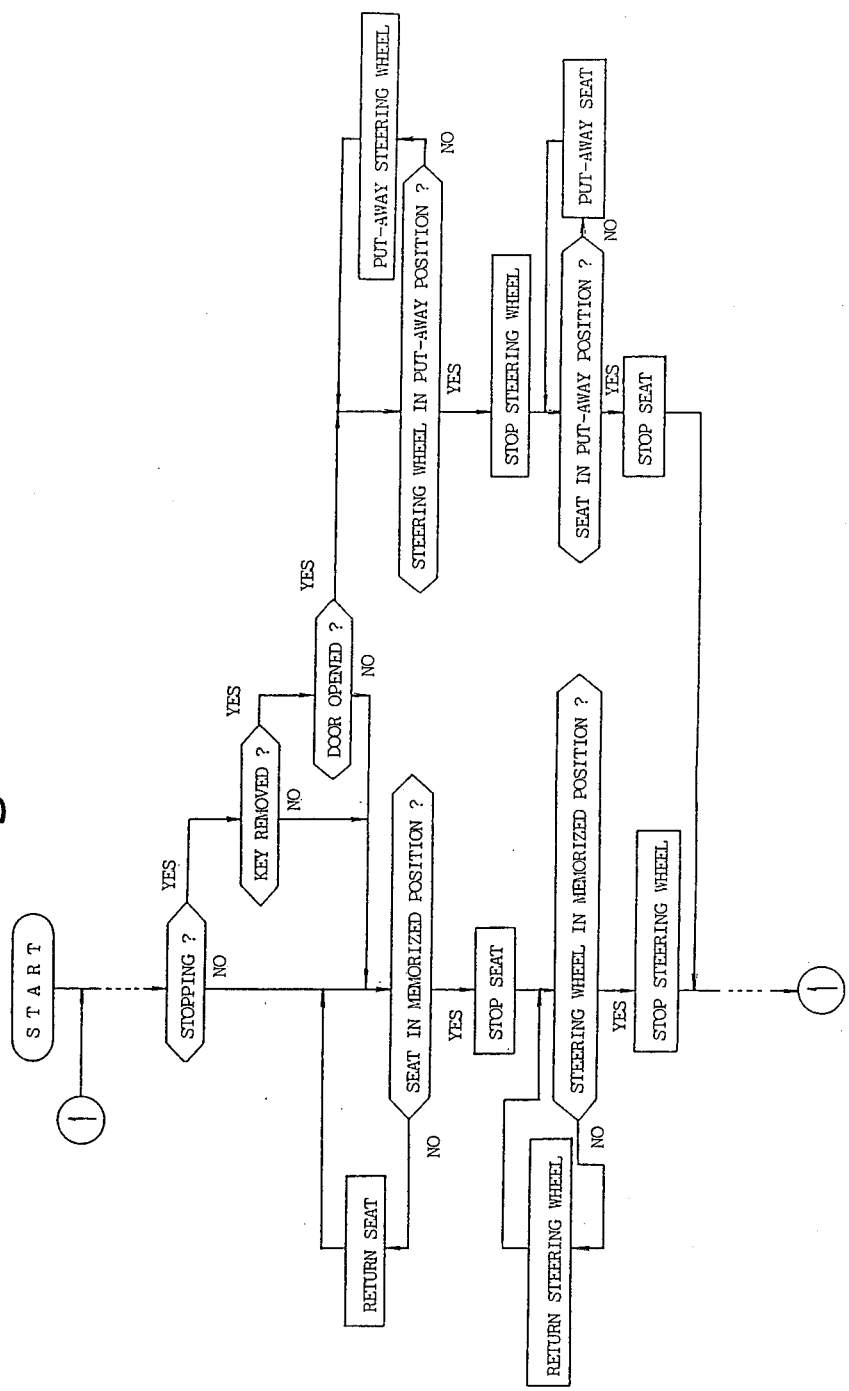

Referring to FIG. 11, in this embodiment, only if the vehicle is stopped, the engine key is removed and the door is opened, the steering mechanism and the seat are retreated into their respective boarding/alighting put-away positions. Other than this case, the steering mechanism and the seat are set into their respective driving positions.

Figure 12:
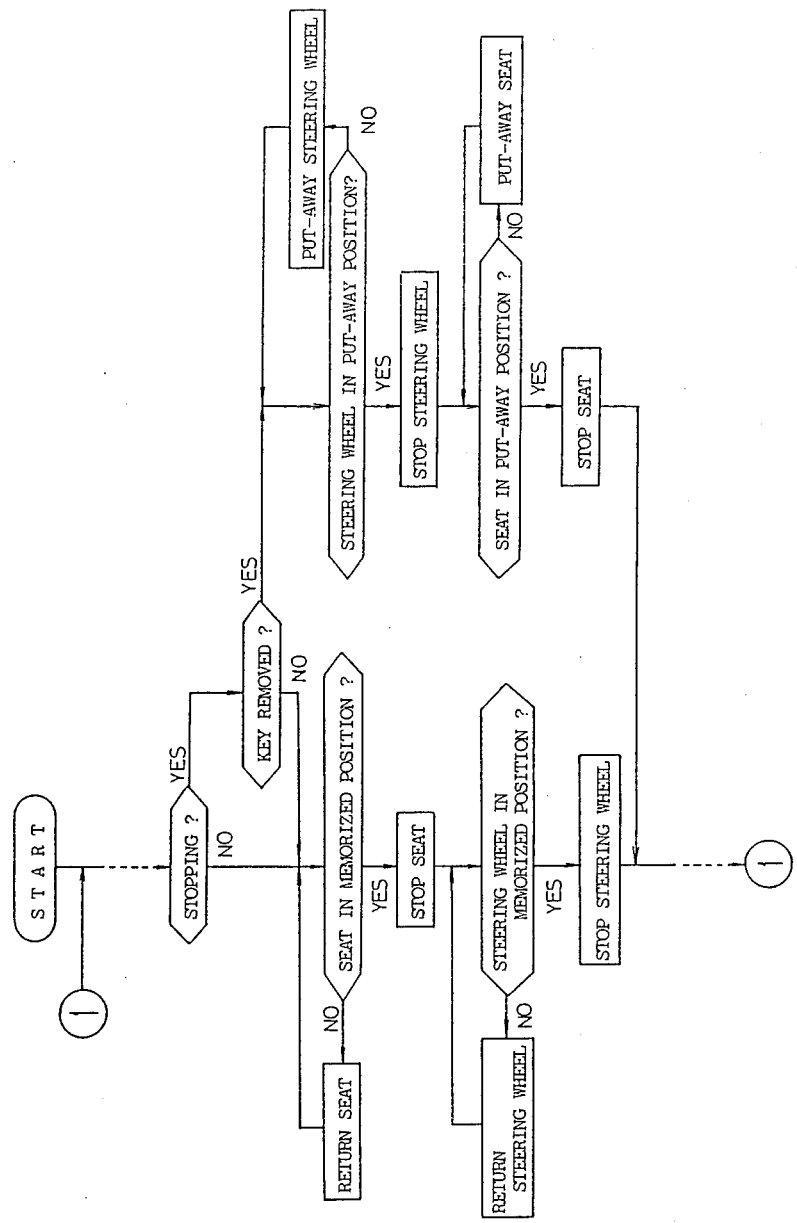

Referring to FIG. 12, in this embodiment, the steering mechanism and the seat are operated independently of opening/closing of the door. More specifically, if the engine key is removed while stopping of the vehicle, the steering mechanism is immediately retreated into a boarding/alighting put-away position and the seat is then retreated into its put-away position. If the engine key is inserted or the vehicle is out of a stopped state, the seat is set into its driving position and the steering mechanism is then set into its driving position.

Although in the above embodiments the vehicle speed, parking brake and insertion/removal of the engine key are monitored as conditions for judgement of stopping of the vehicle, it is also possible to monitor whether or not the shift lever is within a P range, for example, in vehicles equipped with automatic transmissions. Also, although in the embodiments an output of the regulator REG is used to judge whether or not the engine is running, there may be monitored a revolution number signal for driving a tachometer (e.g., pulse signal obtained from an ignition coil) by way of example.

Further, although in the embodiments the select switch SEL is provided to permit switching of the automatic attitude setting conditions in case of no parking brake, the select switch SEL can be dispensed with by utilizing the logical sum of operation of the parking switch PSW, turn-on of the manual put-away switch MSW, turn-on of the door switch DSW (opening of the door), etc. as one condition.

Moreover, although in the embodiments uopn detection of overload of the driving mechanism the motor is reversed and then stopped after returning the attitude by predetermined strokes, the motor may be stopped immediately upon detection of overload in case of no possibility that a human body or any substance could be caught in. This arrangement makes it possible to automatically stop driving of the mechanism at a limit position by utilizing the fact that overload is detected at the time when the mechanism strikes against a stop provided at the limit position, with the result that the limit switch can be omitted which has been conventionally required. This type control can be performed by, for example, omitting the processes PR1, PR2, PR3, PR4, PR5, PR6, PR7, PR8, PR9 and PR10 encircled with imaginary lines in FIGS. 7b-7h.

what we claim is:

1. An attitude controlling system for vehicle-supported equipment comprising:
   a vehicle-supported attitude controlling mechanism for setting an attitude of at least one vehicle-supported equipment such as a steering wheel or seat;
   an electric drive source for driving said vehicle-supported attitude controlling mechanism;
   attitude detection means for detecting the attitude of said vehicle-supported equipment;
   at least two vehicle stoppage detection means for outputting signals in response to the presence or absence of stopping of a vehicle and the boarding-/alighting action of a driver; and
   electronic control means for controlling an automatic operation for energizing said electric drive source to automatically set said vehicle-supported equipment into a boarding/alighting position when said vehicle stoppage detection means outputs at least two signals indicative of stopping of the vehicle and alighting action of the driver and for energizing said electric drive source to automatically set said vehicle-supported equipment into a driving position when said vehicle stoppage detection means outputs signals indicative of release from stopping of the vehicle and boarding action of the driver and for controlling a manual operation energizing said electric drive source in accordance with a state of said manual attitude adjusting switch for inhibiting said automatic operation when said mode changing switch is turned off and for inhibiting said manual operation when said engine stoppage detecting means detects engine stoppage, and wherein said electronic control means monitors the voltage of a vehicle-supported battery and, when the battery voltage is lowered less than a predetermined value, inhibits energization of said electric drive source at least during stop of the engine.

2. An attitude controlling system for vehicle-supported equipment according to claim 1, wherein said vehicle stoppage detection means includes at least two among switch means adapted to detect the status of an engine key, switch means adapted to detect opening/closing of a door, switch means adapted to detect a vehicle speed, switch means adapted to the status of a parking brake of the vehicle, and switch means adapted to detect a position of a shift lever of a transmission.

3. An attitude controlling system for vehicle-supported equipment according to claim 2, wherein said switch means adapted to detect the status of an engine key output a signal in response to insertion/removal of the engine key.

4. An attitude controlling system for vehicle-supported equipment according to claim 1, wherein said vehicle stoppage detection means includes switch means adapted to detect the status of an engine key, switch means adapted to detect a vehicle speed and switch means adapted to detect the status of a parking brake of the vehicle, and when all outputs from said three means indicate stopping of the vehicle, said electronic control means energizes said electric drive source to automatically set said vehicle-supported equipment into a boarding/alighting position.

5. An attitude controlling system for vehicle-supported equipment according to claim 1, wherein said vehicle-supported attitude controlling mechanism comprises a mechanism for setting at least one of inclination and length of a steering column and a mechanism for turning the seat substantially about a vertical axis, and wherein said electronic control means automatically positions the steering column to its boarding/alighting position upon receipt of at least two signals indicative of stopping of the vehicle, turns the seat to automatically position the same into its boarding/alighting position upon detection of opening of the door, turns the seat to automatically position the same to its driving position upon detection of closing of the door, and automatically positions the steering column into its driving position upon release from stopping of the vehicle.

6. An attitude controlling system for vehicle-supported equipment according to claim 1, wherein said electronic control means includes a manual attitude adjusting switch, energizes said electric drive source in response to operation of said manual attitude adjusting switch, detects the presence or absence of rotation of an engine, and upon detection of stop of the engine, inhibits any more attitude adjustment in response to said manual attitude adjusting switch.

7. An attitude controlling system for vehicle-supported equipment according to claim 1, wherein before energizing said electric drive source, said electronic control means monitors a change speed of attitude detected by said attitude detection means to judge the presence or absence of overload, and makes predetermined control upon detection overload.

8. An attitude controlling system for vehicle-supported equipment according to claim 7, wherein said electronic control means stop energization of said electric drive source upon detection of overload.

9. An attitude controlling system for vehicle-supported equipment comprising:

a vehicle-supported attitude controlling mechanism for setting an attitude of at least one vehicle-supported equipment such as a steering wheel, seat and others;

an electric drive source for driving said vehicle-supported attitude controlling mechanism;

attitude detection means for detecting at least one of an attitude of said steering wheel and and attitude of said seat;

a manual attitude adjusting switch;

engine stoppage detecting means;

at least two vehicle stoppage detection means for outputting signals in response to the presence or absence of stopping of a vehicle, or boarding/alighting action of a driver; and electronic control means for controlling an automatic operation for energizing said electric drive source to automatically set said vehicle-supported equipment into a boarding/alighting position, when said vehicle stoppage detection means outputs at least two signals indicative of stopping of energizing said electric drive source to automatically set said vehicle-supported equipment into a driving position, when said vehicle stoppage detection means outputs signals indicative of release from stopping of the vehicle or boarding action of the driver, for controlling a manual operation energizing said electric drive source in accordance with a state of said manual attitude adjusting switch, for inhibiting said automatic operation when said engine stoppage detecting means detects engine stoppage, for monitoring the voltage of a vehicle-supported battery, and for inhibiting said automatic operation and said manual operation when the voltage is lowered less than a predetermined value.

* * * * *

UNITED STATES PATENT AND TRADEMARK OFFICE
CERTIFICATE OF CORRECTION

PATENT NO. : 4,775,939

DATED : October 4, 1988

INVENTOR(S) : Hiroshi NAKASHIMA et al

It is certified that error appears in the above-identified patent and that said Letters Patent is hereby corrected as shown below:

ON THE TITLE PAGE:
[75] Inventors: Please change the name of the third inventor to --Kohji Hirao--.

Signed and Sealed this

Twelfth Day of September, 1989

Attest:

DONALD J. QUIGG

Attesting Officer

Commissioner of Patents and Trademarks